(12) United States Patent
Nasiri Khormuji

(10) Patent No.: US 10,574,415 B2
(45) Date of Patent: Feb. 25, 2020

(54) APPARATUS AND METHOD FOR CONTROLLING RESOURCE ALLOCATION IN A WIRELESS COMMUNICATION NETWORK

(71) Applicant: Huawei Technologies Co., Ltd., Shenzhen (CN)

(72) Inventor: Majid Nasiri Khormuji, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/806,031

(22) Filed: Nov. 7, 2017

(65) Prior Publication Data

US 2018/0076937 A1 Mar. 15, 2018

Related U.S. Application Data

(63) Continuation of application No. PCT/EP2015/060241, filed on May 8, 2015.

(51) Int. Cl.
| | |
|---|---|
| *H04L 5/00* | (2006.01) |
| *H04L 1/00* | (2006.01) |
| *H04W 8/18* | (2009.01) |
| *H04W 72/04* | (2009.01) |
| *H04L 5/14* | (2006.01) |

(52) U.S. Cl.
CPC .......... *H04L 5/0048* (2013.01); *H04L 1/0026* (2013.01); *H04L 5/0007* (2013.01);
(Continued)

(58) Field of Classification Search
CPC ... H04L 5/0048; H04L 5/0007; H04L 1/0026; H04L 5/0073; H04L 5/0023;
(Continued)

(56) References Cited

U.S. PATENT DOCUMENTS

2006/0039318 A1\* 2/2006 Oh .................. H04L 5/0007
370/328
2013/0265955 A1 10/2013 Kim et al.
(Continued)

FOREIGN PATENT DOCUMENTS

| CN | 1761182 A | 4/2006 |
|---|---|---|
| CN | 104254995 A | 12/2014 |

(Continued)

OTHER PUBLICATIONS

Marzetta, "Noncooperative Cellular Wireless with Unlimited Numbers of Base Station Antennas," IEEE Transactions on Wireless Communications, vol. 9, No. 11, pp. 3590-3600, Institute of Electrical and Electronics Engineers, New York, New York (Nov. 2010).
(Continued)

*Primary Examiner* — Dady Chery

(74) *Attorney, Agent, or Firm* — Leydig, Voit & Mayer, Ltd.

(57) ABSTRACT

An apparatus and method for allocating time-frequency resource, comprising: allocating a first group-specific data time-frequency resource to data sequences associated to UEs comprised in a first UE group of the plurality of UE groups; and allocating a second group-specific data time-frequency data resource to data sequences associated to UEs comprised in a second UE group of the plurality of UE groups; wherein the first and the second group-specific data time-frequency resources at least partly overlap in time domain.

15 Claims, 10 Drawing Sheets

(52) U.S. Cl.
CPC ........... *H04L 5/0073* (2013.01); *H04W 8/186* (2013.01); *H04W 72/0453* (2013.01); *H04L 5/0023* (2013.01); *H04L 5/0044* (2013.01); *H04L 5/1469* (2013.01)

(58) Field of Classification Search
CPC ............... H04L 5/1469; H04L 5/0044; H04W 72/0453; H04W 8/186
See application file for complete search history.

(56) References Cited

U.S. PATENT DOCUMENTS

2014/0105146 A1 4/2014 Kwak et al.
2014/0362832 A1 12/2014 Rudolf et al.

FOREIGN PATENT DOCUMENTS

WO 2014208859 A1 12/2014
WO 2015197110 A1 12/2015
WO 2015197142 A1 12/2015

OTHER PUBLICATIONS

Shepard et al., "ArgosV2: A Flexible Many-Antenna Research Platform," Mobile Computing and Networking (MobiCom), ACM, Miami, Florida (Sep. 30-Oct. 4, 2013).

Gao et al., "Linear pre-coding performance in measured very-large MIMO channels," IEEE Vehicular Technology Conference (VTC Fall), Institute of Electrical and Electronics Engineers, New York, New York (Sep. 2011).

Rusek et al., "Scaling Up MIMO: Opportunities and challenges with very large arrays," IEEE Signal Processing Magazine, pp. 40-60, Institute of Electrical and Electronics Engineers, New York, New York (Jan. 2013).

Du et al., "Virtual HetNet: A Backhaul Free Pico Cell Implementation Solution," IEEE GlobeCom 2013—Next Generation Networking Symposium, pp. 2199-2203, Institute of Electrical and Electronics Engineers, New York, New York (2013).

Hassibi et al., "How Much Training is Needed in Multiple-Antenna Wireless Links?," IEEE Transactions on Information Theory, vol. 49, No. 4, pp. 951-963, Institute of Electrical and Electronics Engineers, New York, New York (Apr. 2003).

* cited by examiner

APPARATUS AND METHOD FOR CONTROLLING RESOURCE ALLOCATION IN A WIRELESS COMMUNICATION NETWORK

CROSS-REFERENCE TO RELATED APPLICATIONS

This application is a continuation of International Application No. PCT/EP2015/060241, filed on May 8, 2015, the disclosure of which is hereby incorporated by reference in its entirety.

TECHNICAL FIELD

Embodiments described herein generally relate to an apparatus and a method for controlling resource allocation.

BACKGROUND

Massive Multiple-Input Multiple-Output (mMIMO) enables space-division multiple-access (SDMA) if the channel matrix between transmit and receive antennas is known. Radio channel estimation is an essential part as it allows separating the data streams associated to different UEs.

To estimate the radio channel between different nodes, i.e. UEs, base station, access node, radio head, hyper transmitters etc., one generally transmits signals known at both transmit and receive nodes. These known signals are referred to as reference signals or pilot signals, which are also called reference symbols and pilot symbols, respectively. Using these pilot symbols one can estimate the unknown radio channel between transmit and receive nodes. Sending the pilot symbols in general leads to a loss in spectrally efficiency as it requires additional time-frequency resources to be used. The number and density of pilot symbols depend on the number of antennas and time-frequency characteristics of the radio channel. To acquire the radio channel in the time-frequency grid in the Time-Division Duplex (TDD) mode for mMIMO communication in a cell with K UEs each with a single antenna, K orthogonal pilot symbols, each associated to a UE, are required over a time-frequency grid of the size $T_c \times B_c$ where $T_c$ denotes the coherence time and $B_c$ denotes the coherence bandwidth of the channel. A coherence time $T_c$, is the number of symbols for which the channel approximately remains unchanged in time domain. A coherence bandwidth $B_c$ is an approximate maximum bandwidth or frequency interval over which two frequencies of a signal are likely to experience comparable or correlated amplitude fading.

For TDD mMIMO communications when the number of antennas is very large the limiting factor for achieving high network throughput is the user mobility captured in the coherence time and bandwidth. FIG. 1 shows the behavior of the aggregate rate changes along with a number of active UE equipment (UE). The aggregate rate, also referred to as sum-rate, increases with UEs quantity up to a certain number and it then decreases. The optimal number of scheduled UEs in the conventional TDD is $$\left\lfloor \frac{T_c B_c}{2} \right\rfloor.$$

The sum-rate increases by scheduling one additional UE as long as the number of UEs are less than $$\left\lfloor \frac{T_c B_c}{2} \right\rfloor.$$

Scheduling bigger number of UEs, results to larger overhead in order to ensure orthogonal pilot transmission for channel estimation and hence the transmission is limited up to $$K = \lfloor T_c B_c \rfloor - 1$$

UEs. Scheduling additional UEs, it means that the pilot sequences for channel estimation should be reused, because there are no enough orthogonal pilot sequences when the number of UEs is above $\lfloor T_c B_c \rfloor$. Therefore, the phenomena known as pilot contamination causes a severe degradation in the performance. Therefore the problem of conventional art is it cannot schedule more UEs beyond $$\left\lfloor \frac{T_c B_c}{2} \right\rfloor$$

in order to enable an enhanced aggregate rate, i.e. spectral efficiency of transmission.

SUMMARY

It is therefore an object to obviate the above mentioned disadvantages and to improve the performance in a wireless communication network.

This and other objects are achieved by the features of the appended independent claims. Further implementation forms are apparent from the dependent claims, the description and the figures.

According to a first aspect, a controller is provided.

In a first possible implementation form of the controller according to the first aspect, the controller comprises a processor configured to group a plurality of UEs into a plurality of UE groups, like a first UE group and a second UE group. Additionally, the processor is further configured to allocate a first group-specific data time-frequency resource to data sequences associated to UEs comprised in a first UE group of the plurality of UE groups; to allocate a second group-specific data time-frequency resource to data sequences associated to UEs comprised in a second UE group of the plurality of UE groups; wherein the first and the second group-specific data time-frequency resources at least partly overlap in time domain.

The UEs can be grouped into multiple UE groups, allocating time-frequency resource is performed for each data sequence group. By grouping UEs into different UE groups, allocating time-frequency resource per group is enabled. By allocating at least partly overlapping time-frequency resources in time domain for data sequences, common time domain resources are used by multiple data sequence groups, multiple data sequence groups can be concurrently transmitted over the common time domain resources, by which an efficient utilization of the time-frequency resources is enabled.

Data sequences associated to the UEs of each group formed a corresponding data sequence group. Data sequences comprised in one data sequence group have the same time-frequency resource. A data sequence associated to a UE can be a downlink data sequence which transmits to the UE; can also be an uplink data sequence receiving from the UE.

Data sequences in one data sequence group are of the same time length, however those in different data sequence groups are not necessary in the same time length. The time-frequency resources are overlapping at least in part in time domain. In other words, not necessary all, but a part of the time-frequency resources are common in time domain. Specifically, each time-frequency resource comprises a plurality of time-frequency resource elements, some of the time-frequency resource elements of the different time-frequency resources share the same time slot.

In a second possible implementation form of the controller according to the first possible implementation form of the first aspect, the processor is further configured to assign a pilot sequence to each UE, wherein the pilot sequences are mutually orthogonal within each UE group.

By assigning pilot sequences that are mutually orthogonal within each group, the pilot contamination within each group is avoided. Furthermore, scheduling a big number of UEs is enabled, owing to a pilot sequence can be reused in a different UE group, hence the quantity of UEs can be scheduled is not limited to the quantity of mutually orthogonal pilot sequences.

In a third possible implementation form of the controller according to the first or second possible implementation form of the first aspect, the processor is further configured to allocate a first group-specific pilot time-frequency resource for pilot sequences from the UEs comprised in the first UE group; and to allocate a second group-specific pilot time-frequency resource for pilot sequences from the UEs comprised in the second UE group. The first and the second group-specific pilot time-frequency resources do not overlap at least in one of frequency domain and time domain.

Allocating time-frequency resources is performed for each pilot sequence group, which comprises the pilot sequences from the UEs comprised in each UE group. The pilot sequences comprised in one pilot sequence group are allocated the same time-frequency resources. By allocating group-specific non-overlapping time-frequency resources for multiple pilot sequence groups, reusing pilot sequence in a different UE group is enabled, thereby an inter-group pilot contamination is avoided when a pilot sequence is reused.

Non-overlapping time-frequency resources are exclusive for each pilot sequence group. Specifically, each time-frequency resource comprises a plurality of time-frequency resource elements, non-overlapping means no common time-frequency resource elements are shared by the first and the second group-specific pilot time-frequency resources. No common time-frequency resource elements means they are not in common at least in one of frequency domain and time domain.

Pilot sequences in one pilot sequence group are of the same time length, however those in different pilot sequence groups are not necessary in the same time length. The length of a pilot sequence may depend on at least one of a quantity of UEs in each UE group and a quality of a radio channel estimation. For example, when the number of UEs in each UE group is different, the length of pilot sequences may be different.

The pilot sequences from the UEs can be uplink pilot sequences receiving from the UEs.

In a fourth possible implementation form of the controller according to the third possible implementation form of the first aspect, the first and the second group-specific pilot time-frequency resources do not overlap in time domain and at least partly overlap in frequency domain.

By at least partly overlapping in frequency domain, common frequency resource is used by multiple pilot sequences groups. The multiple pilot sequence groups can be concurrently transmitted over the common frequency resource, further enhancement in efficient utilization of the time-frequency resources is enabled.

In a fifth possible implementation form of the controller according to the third possible implementation form of the first aspect, the first and the second group-specific pilot time-frequency resources do not overlap in frequency domain and at least partly overlap in time domain.

By at least partly overlapping in time domain, common time resource is shared by multiple pilot sequences groups. The multiple pilot sequence groups can be concurrently transmitted over the common time resource, further improvement in efficient utilization of the time-frequency resources is enabled.

In a sixth possible implementation form of the controller according to the fifth possible implementation form of the first aspect, for each UE group the group-specific pilot time-frequency resources at least partly overlap in time domain with the group-specific data time-frequency resource.

Owing to the time domain overlapping, common time resources can be used by all pilot sequence groups and data sequence groups, utilization efficiency of the time-frequency resources is further increased.

In a seventh possible implementation form of the controller according to the fifth possible implementation form of the first aspect, for each UE group the group-specific pilot time-frequency resource is prior to or after the group-specific data time-frequency resource in one of time domain and frequency domain. The processor is further configured to allocate a partial blanking in the other domain for the pilot sequences from the UEs comprised in at least one UE group (260) of the plurality of UE groups. The sum of a length of the partial blanking and a length of the corresponding pilot sequences in the other domain is equal to a length of the corresponding data sequences in the other domain.

Data sequences can be either uplink or downlink, for downlink data sequence, it is normally required to transmit the pilot sequence before the downlink data sequence since the downlink data sequence needs to be first precoded by the channel estimation using the pilot sequence. When the group-specific pilot time-frequency resource is prior to the group-specific data time-frequency resource in time domain, both the downlink and uplink data sequences transmission in the group-specific data time-frequency resource is allowed. When the pilot time-frequency resource is after the data time-frequency resources in time domain, the uplink data sequences transmission in the data time-frequency resource is allowed.

Partial blanking is used to achieve frequency shift, in order to avoid pilot contamination between the UE groups. In other words, overlapped regions for pilot sequences of different pilot sequence groups are filled by partial blanking, by doing this, the pilot contamination between the UE groups is avoided.

In an eighth possible implementation form of the controller according to the seventh possible implementation form of the first aspect, the processor is further configured to, for at least one UE group, allocate group-specific data time-frequency resources to data sequences associated to UEs comprised in the UE group.

This can be performed for only one UE group, can also be performed for more than one UE group. When it is performed for more than one UE group, group-specific data time-frequency resources may at least partly overlap in time domain.

By allocating additional data time-frequency resources for data sequence, more data sequence can be transmitted or received by an access node, which enables more efficient utilization of the time-frequency resources. Again, thanks to the overlapping in time domain, multiple data sequences can be concurrently transmitted over the common time domain resources, utilization efficiency of the time-frequency resources is further increased. Data sequences associated to all UEs can be either uplink or downlink data depending on the position of a pilot sequence.

To have an accurate channel estimation for all UEs, the size of subframe in the time-frequency should the less than $B_c \times T_c$. All data sequences and pilot sequences associating to one UE group should be within one subframe, i.e., the sum of the all group-specific data time-frequency resources and the group-specific pilot time-frequency resources are less than $B_c \times T_c$ for each UE group.

In a ninth possible implementation form of the controller according to any of the preceding possible implementation forms of the first aspect, the processor is further configured to group a quantity of UEs in each UE group based on a coherence time $T_c$ and a coherence bandwidth $B_c$ of a radio channel.

By grouping based on the coherence time $T_c$ and the coherence bandwidth $B_c$, radio channel characteristics are taken into account. For instance, the processor groups a maximum number of UEs in each group less than $0.5\, T_c \times B_c$.

In a tenth possible implementation form of the controller according to any of the preceding possible implementation forms of the first aspect, the processor is further configured to update the grouping of UEs based on user mobility, channel conditions, active number of UEs within range and transmission load.

In another possible implementation form of the controller according to any of the second to tenth possible implementation forms of the first aspect, the processor is further configured to update the assigning of pilot sequences based on user mobility, channel conditions, active number of UEs within range and transmission load.

In another possible implementation form of the controller according to any of the seventh to tenth possible implementation forms of the first aspect, the processor is further configured to update the assigning of partial blanking based on user mobility, channel conditions, active number of UEs within range and transmission load.

By updating and re-performing the grouping of UEs continuously, or at certain predetermined time intervals, the grouping and assignment of resources may be continuously optimised and compensation for UEs movement within the cell may be made.

In an eleventh possible implementation form of the controller according to any of the preceding possible implementation forms of the first aspect, wherein the processor is configured to group the plurality of UEs into at least the first UE group and the second UE group, based on cell location of each UE.

By grouping the UEs based on physical position, e.g. which cell the UE is positioned in, the risk of interference between pilot sequences be re-used by other groups may be reduced as it may be possible to filter out such interfering pilot sequences, e.g. in case of Massive MIMO implementation form, where interfering signals may be filtered out from the direction of the source of the interfering signal.

In a twelfth possible implementation form of the controller according to the eleventh possible implementation form of the first aspect, wherein the processor is furthermore configured to group the UEs situated within a Macro cell into the first UE group, and to group the UEs situated within a virtual Pico cell into the second UE group.

Again, by grouping the UEs based on physical position, e.g. which cell the UE is positioned in, the risk of interference between pilot sequences be re-used by other groups may be reduced as it may be possible to filter out such interfering pilot sequences, e.g. in case of Massive MIMO implementation form, where interfering signals may be filtered out from the direction of the source of the interfering signal.

In a thirteenth possible implementation form of the controller according to the eleventh possible implementation form or the twelfth possible implementation form of the first aspect, wherein the processor is further configured to group the UEs, based on Channel Quality Index, CQI, wherein UEs associated with a CQI lower than a threshold value are grouped into the first UE group.

UEs having a low CQI may typically be positioned at the cell border and are in particular sensible for interference. By the disclosed implementation form, these UEs are grouped in one group, wherein there is no interference by any simultaneously transmitted pilot sequences from other UEs in other UE groups. Thereby, it is avoided that the communication link to such UE is lost.

In an fourteenth possible implementation form of the controller according to any of the preceding possible implementation forms of the first aspect, wherein the processor is further configured to coordinate reception and transmission at a plurality of access nodes, associated with the controller in Coordinated Multi-Point, CoMP, transmissions.

Thereby communication of a UE via a plurality of access nodes in CoMP transmissions is enabled.

In an fifteenth possible implementation form of the controller according to any of the preceding possible implementation forms of the first aspect, wherein the processor is further configured to instruct at least one UE to adjust transmission power, based on at least one of channel estimation of each UE group.

By adjusting the transmission power, interference between UEs in the uplink is further reduced.

The controller as above can be a part of an access node, can also be in a form of independent from an access node.

In a further possible implementation form of the controller according to any of the preceding possible implementation forms of the first aspect, when the controller is not a part of an access node, wherein the controller further comprises a transmitter configured to transmit a signal informing an access node of the allocated group-specific pilot time-frequency resource, the allocated group-specific data time-frequency resources and the allocated partial blanking.

According to a second aspect, an access node is provided. The controller according to any of the preceding possible implementation forms of the first aspect is a part of the access node.

In a first possible implementation form of the access node according to the second aspect, the access node comprises a controller according to any of the preceding possible implementation forms of the first aspect and an antenna array having at least one antenna. The antenna is configured to transmit and receive a signal comprising the data sequences and the pilot sequences from the UEs grouped in each UE group.

In another possible implementation form of the controller according to the first possible implementation form of the second aspect, the access node further comprises a processor configured to estimate a channel corresponding to each UE in each UE group, based on the pilot sequences from UEs grouped in each UE group.

An access node for receiving a signal comprising data sequences and the assigned pilot sequences from UEs grouped in each UE group is provided. The access node comprises the controller as above, inter-device signal exchange is avoided, the access node as such is enabled to group UEs and to allocated time-frequency resources locally. The access node has the advantages as those discussed in the controller as above.

In a second possible implementation form of the controller according to the any possible implementation form of the second aspect, the processor of the access node is further configured to detect the data sequences from the UEs in each UE group.

In a third possible implementation form of the access node according to the second aspect, the access node comprises a controller according to the seventh or eighth possible implementation form of the first aspect and an antenna array having at least one antenna, wherein the access node is coupled to the antenna, wherein the access node further comprises a processor configured to map data sequences to at least one of the first, the second, the third and the fourth group-specific data time-frequency resources which is after the corresponding group-specific pilot time-frequency resource in time domain. The antenna is configured to transmit the data sequences to the plurality of UEs.

An access node for mapping and transmitting downlink data sequences based on the allocated time-frequency resources, and for receiving a signal comprising the assigned pilot sequences from UEs grouped in each UE group is provided. Again, an access node comprises the controller as above, inter-device signal exchange is therefore avoided, the access node as such is enabled to group UEs and to allocated time-frequency resources locally. The access node has the advantages as those discussed in the controller as above.

In a fourth possible implementation form of the access node according to the second aspect, the access node comprises a controller according to the eighth possible implementation form of the first aspect and an antenna array having at least one antenna, the access node is further configured to receive or transmit additional data sequences over the additional allocated time-frequency resources.

Specifically, when the data sequences associated to all UEs is downlink data sequences, the access node is coupled to the antenna, the access node further comprises a processor configured to map data sequences to the additional allocated time-frequency resources, the antenna is further configured to transmit a signal comprising the data sequences to be transmitted to the UE; when the data sequences associated to all UEs is uplink data sequences, the access node is coupled to the antenna, the antenna is configured to receive a signal comprising data sequences from the UEs grouped in each UE group, the processor of the access node may further be configured to detect the data sequences from the UEs.

According to a third aspect, a method for allocating time-frequency resources is provided.

In a first possible implementation form of the third aspect, the method comprises grouping a plurality of UEs into a plurality of UE groups, like a first UE group and a second UE group. Additionally, the method further comprises allocating a first group-specific data time-frequency resource to data sequences associated to UEs comprised in a first UE group of the plurality of UE groups; and allocating a second group-specific data time-frequency resource to data sequences associated to UEs comprised in a second UE group of the plurality of UE groups; wherein the first and the second group-specific data time-frequency resources at least partly overlap in time domain.

In a second possible implementation form of the method according to the first possible implementation form of the third aspect, the method further comprises assigning a pilot sequence to each UE, wherein the pilot sequence are mutually orthogonal within each UE group.

In a third possible implementation form of the method according to any possible implementation form of the third aspect, the method further comprises allocating a first group-specific pilot time-frequency resource for pilot sequences from the UEs comprised in the first UE group; and allocating a second group-specific pilot time-frequency resource for pilot sequences from the UEs comprised in the second UE group. The first and the second group-specific pilot time-frequency resources do not overlap at least in one of frequency domain and time domain.

In a fourth possible implementation form of the method according to the third possible implementation form of the third aspect, the first and the second group-specific pilot time-frequency resources do not overlap in time domain and at least partly overlap in frequency domain.

In a fifth possible implementation form of the method according to the third possible implementation form of the third aspect, the first and the second group-specific pilot time-frequency resources do not overlap in frequency domain and at least partly overlap in time domain.

In a sixth possible implementation form of the method according to the fifth possible implementation form of the third aspect, for each UE group the group-specific pilot time-frequency resources at least partly overlap in time domain with the group-specific data time-frequency resource.

In a seventh possible implementation form of the method according to the fifth possible implementation form of the third aspect, for each UE group the group-specific pilot time-frequency resource is prior to or after the group-specific data time-frequency resource in one of time domain and frequency domain. The method further comprises allocating a partial blanking in the other domain for the pilot sequences from the UEs comprised in at least one UE group (260) of the plurality of UE groups. The sum of a length of the partial blanking and a length of the corresponding pilot sequences in the other domain is equal to a length of the corresponding data sequences in the other domain.

In an eighth possible implementation form of the method according to the seventh possible implementation form of the third aspect, the method further comprises allocating at least one UE group, group-specific data time-frequency resource to data sequences associated to UEs comprised in the UE group.

This can be performed for only one UE group, can also be performed for more than one UE group. When it is performed for more than one UE group, group-specific data time-frequency resources may at least partly overlap in time domain.

In a ninth possible implementation form of the method according to the third aspect or according to any of the preceding possible implementation forms of the third aspect, the grouping comprises grouping a quantity of UEs in each UE group based on a coherence time $T_c$ and a coherence bandwidth $B_c$ of radio channels.

In a tenth possible implementation form of the method according to any of the seventh and ninth possible implementation forms of the third aspect, the method further comprises updating the grouping of UEs, the assigning of pilot sequences, the assigning of partial blanking, based on user mobility, channel conditions, active number of UEs within range and transmission load.

In an eleventh possible implementation form of the method according to the third aspect or according to any of the preceding possible implementation forms of the third aspect, wherein the grouping comprises grouping the plurality of UEs into at least the first UE group and the second UE group, based on cell location of each UE.

In a twelfth possible implementation form of the method according to the eleventh possible implementation form of the third aspect, the grouping comprises grouping the UEs situated within a Macro cell into the first UE group, and to group the UEs situated within a virtual Pico cell into the second UE group.

In a thirteenth possible implementation form of the method according to the eleventh possible implementation form or the twelfth possible implementation form of the third aspect, wherein the grouping comprises grouping the UEs, based on Channel Quality Index, CQI, wherein UEs associated with a CQI lower than a threshold value are grouped in the first UE group.

In an fourteenth possible implementation form of the method according to the third aspect or according to any of the preceding possible implementation forms of the third aspect, wherein the method further comprises coordinating reception and transmission at a plurality of access nodes, associated with the method in Coordinated Multi-Point, CoMP, transmissions.

Thereby communication of a UE via a plurality of access nodes in CoMP transmissions is enabled.

In an fifteenth possible implementation form of the method according to the third aspect or according to any of the preceding possible implementation forms of the third aspect, the method further comprises instructing at least one UE to adjust transmission power, based on at least one of channel estimation of each UE group.

The method as above can be performed by an access node or another physical entity independent from an access node.

In a further possible implementation form of the method according to the third aspect or according to any of the preceding possible implementation forms of the third aspect, when the method is not performed by an access node, wherein the method further comprises transmitting a signal informing an access node of the allocated group-specific pilot time-frequency resource, the allocated group-specific data time-frequency resources and the allocated partial blanking.

The advantages of the methods according to the third aspect and the possible implementation forms thereof are the same as those of the corresponding device according to the first and second aspects and possible implementation forms.

According to a fourth aspect, a computer program is provided, which comprises program code for performing a method according to the third aspect, or any possible implementation form thereof, when the computer program runs on a computer. Further, the invention also provides a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Other objects, advantages and novel features of the described different aspects of the invention will become apparent from the following detailed description.

BRIEF DESCRIPTION OF THE DRAWINGS

Various embodiments of the invention are described in more detail with reference to attached drawings illustrating examples of embodiments of the invention in which.

DETAILED DESCRIPTION

Embodiments of the invention described herein are defined as a controller 940 and a method in a controller 940 or an access node 210, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
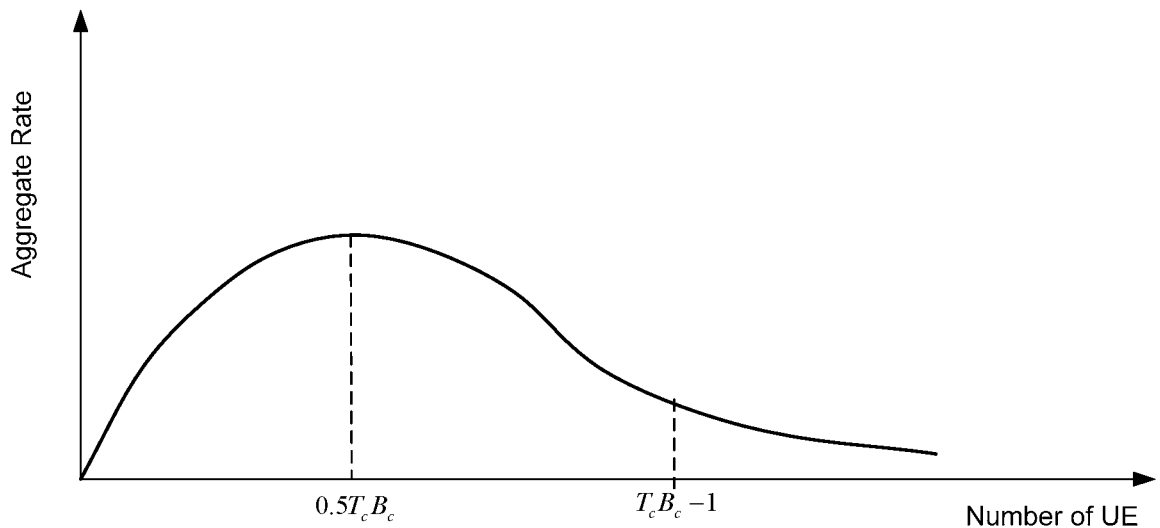
FIG. 1 is a diagram illustrating Aggregate rate versus the number of UEs using conventional TDD mMIMO.
Figure 2:
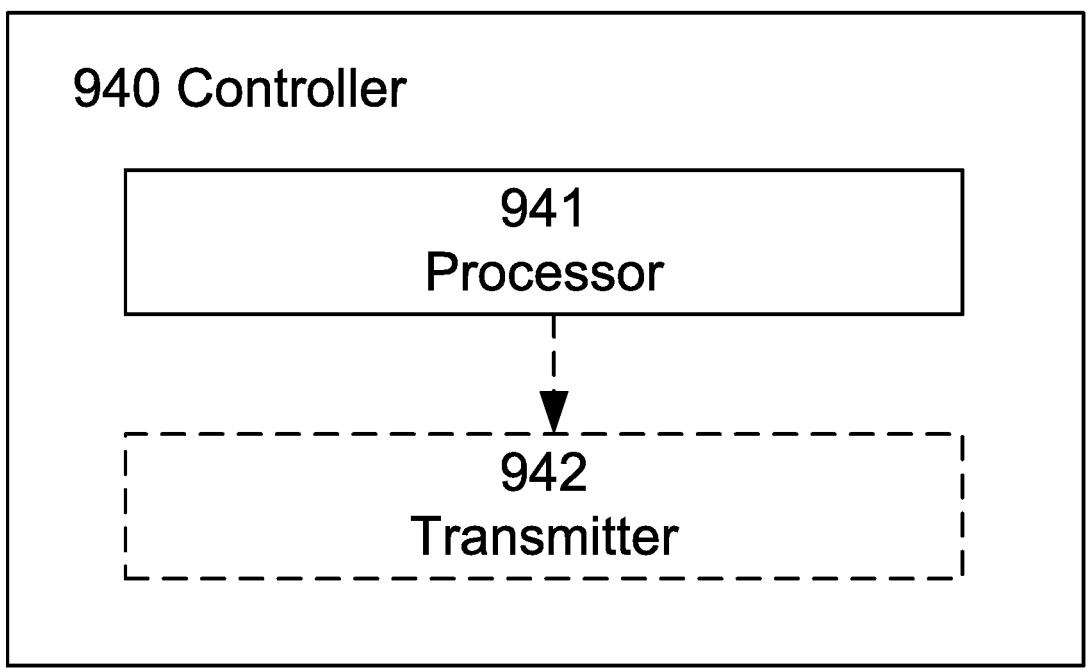
FIG. 2 is a block diagram illustrating a controller according to an embodiment of the present invention.

FIG. 2 illustrates a block diagram of a controller 940 according to an embodiment of the present invention, for controlling time-frequency resource allocation in a wireless communication network. The controller 940 comprises a processor 941 and may further comprise a transmitter 942 when the controller 940 is not a part of an access node 210.

Figure 3A:
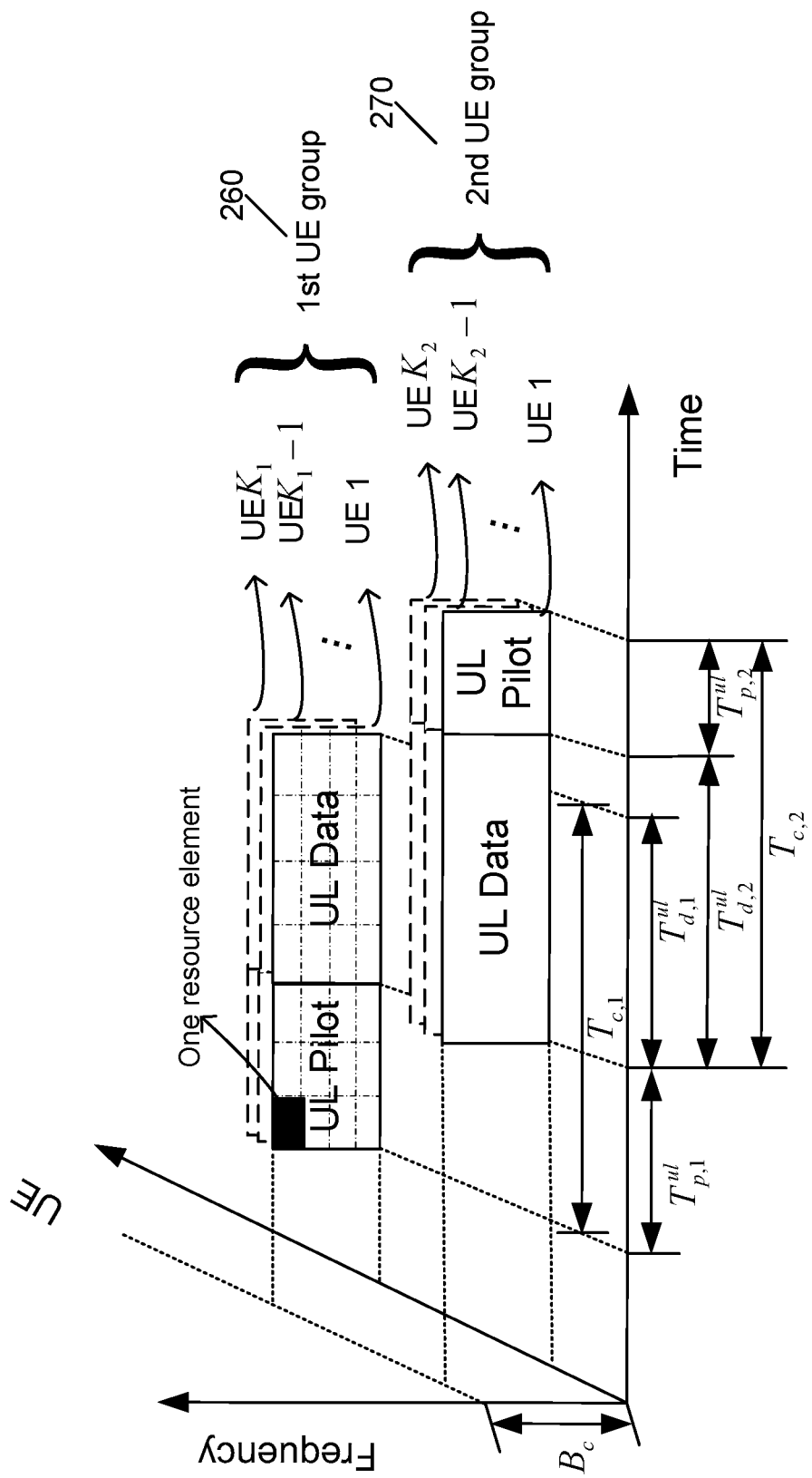
FIG. 3A is a block diagram illustrating a time-frequency resource allocation scheme according to an embodiment of the present invention.

The processor 941 groups a plurality of UEs into a plurality of UE groups, for instance, a first UE group 260 and a second UE group 270 as shown in FIG. 3A.

In a possible implementation form the processor 941 may group the UEs based on a coherence time $T_c$ and a coherence bandwidth $B_c$ of radio channels. For instance, the processor 941 groups a maximum number of UEs in each group less than $0.5\ T_c \times B_c$. Another possible implementation form is that the processor 941 groups the UEs based on cell location of each UE. As an example, the processor 941 groups the UEs situated within a Macro cell into the first UE group, and to group the UEs situated within a virtual Pico cell into the second UE group. Another possible implementation form is the processor 941 groups the UEs, based on Channel Quality Index, CQI, for instance, UEs associated with a CQI lower than a threshold value are grouped in the first UE group. In another possible implementation form, the above three implementation forms for grouping UEs are combined in any form.

Additionally, the processor 941 further allocates a first group-specific data time-frequency resource to data sequences associated to UEs comprised in the first UE group 260; to allocate a second group-specific data time-frequency resource to data sequences associated to UEs comprised in the second UE group 270; wherein the first and the second group-specific data time-frequency resources at least partly overlap in time domain.

If we say data sequences associated to the UEs comprised in one UE group form a data sequence group, the data sequences comprised in one data sequence group are allocated the same time-frequency resources. A data sequence associated to a UE can be a downlink data sequence which transmits the UE; can also be an uplink data sequence receiving from the UE.

The time-frequency resource comprises a plurality of time-frequency resource elements. The time-frequency resources at least partly overlap, in other words, not necessary all, but at least some of the time-frequency resource elements are in common in time domain. Data sequences in one data sequence group are of the same time duration, however those in different data sequence groups are not necessary in the same time duration. When data sequences in different data sequence groups are of different time duration, they are allocated different number of resource elements. As shown in FIG. 3A, the second data sequence group is one element resource element longer than the first data sequence group in time domain, four resource elements in time domain are in common for data sequence groups.

The processor 941 may further allocate a first group-specific pilot time-frequency resource for pilot sequences from the UEs comprised the first UE group 260; and to allocate a second group-specific pilot time-frequency resource for pilot sequences from the UEs comprised in the second UE group 270, wherein the first and the second group-specific pilot time-frequency resources do not overlap at least in one of frequency domain and time domain.

If we say those pilot sequences sent from the UEs comprised in one UE group form a pilot sequence group, the non-overlapping time-frequency resource exclusive for each pilot sequence group, so that inter-group pilot contamination is avoided.

Allocating time-frequency resources is performed for each pilot sequence group. The pilot sequences comprised in one pilot sequence group are allocated the same time-frequency resources. For the allocating time-frequency resources is performed for each pilot sequence group, an inter-group pilot contamination is further avoided when a pilot sequence is reused.

The pilot sequences in one pilot sequence group are of the same time length, however those in different pilot sequence groups are not necessary in the same time length. The length of a pilot sequence may depend on at least one of a quantity of UEs in each UE group and a quality of a radio channel estimation. For example, when the number of UEs in each UE group is different, the length of pilot sequences may be different. In FIG. 3A, there are K1 and K2 number of UEs in the first and second UE groups 260, 270, respectively, the first pilot sequence group is one resource element in time domain longer than the second pilot sequence group.

The pilot sequences from the UEs are uplink (UL) pilot sequences receiving from the UEs, shown as UL Pilot in FIG. 3A.

A time-frequency resource has two domains, i.e., time domain and frequency domain, as long as one of the two domains do not overlap, the time-frequency resources are non-overlapping. In an embodiment, the group-specific pilot time-frequency resources do not overlap in time domain and at least partly overlap in frequency domain. While in an alternative embodiment, the group-specific pilot time-frequency resources do not overlap in frequency domain and at least partly overlap in time domain.

The group-specific pilot time-frequency resources at least partly overlap in either time domain or frequency domain, which enables common time-frequency resource reused in this domain. Increase in efficient utilization of the time-frequency resources is achieved.

In an embodiment, the 941 may further assign a pilot sequence to each UE, wherein the pilot sequence are mutually orthogonal within each UE group, so that the pilot contamination is avoided within each UE group meanwhile the pilot sequence can be reused in different UE groups. In other words, the processor 941 may further assign mutually orthogonal pilot sequences for the plurality of UEs within each UE group.

In an embodiment, the first and the second group-specific pilot time-frequency resources do not overlap in time domain and at least partly overlap in frequency domain.

Figure 4A:
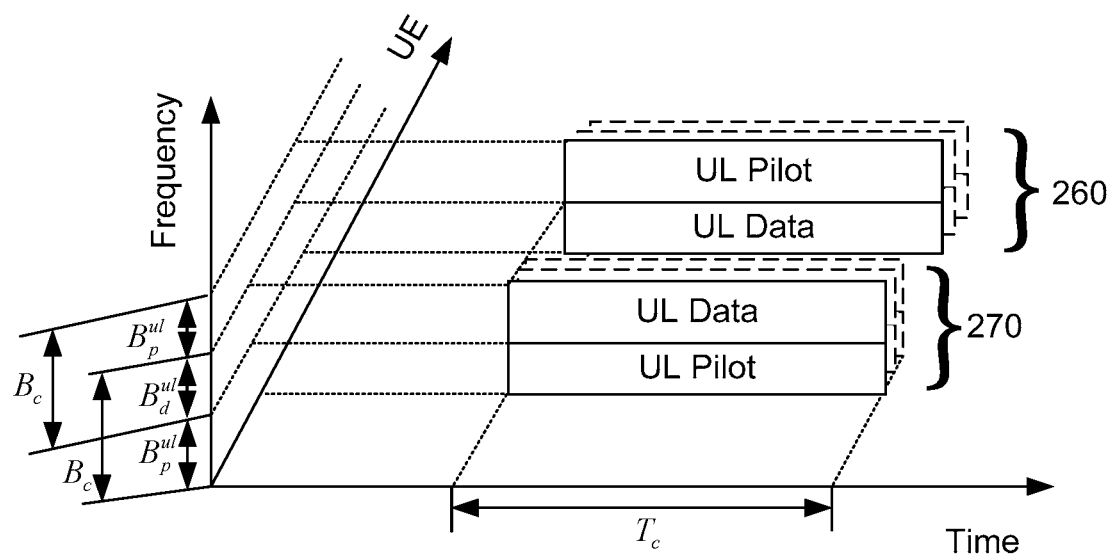
FIG. 4A is a block diagram illustrating a time-frequency resource allocation scheme according to another embodiment of the present invention.
Figure 4B:
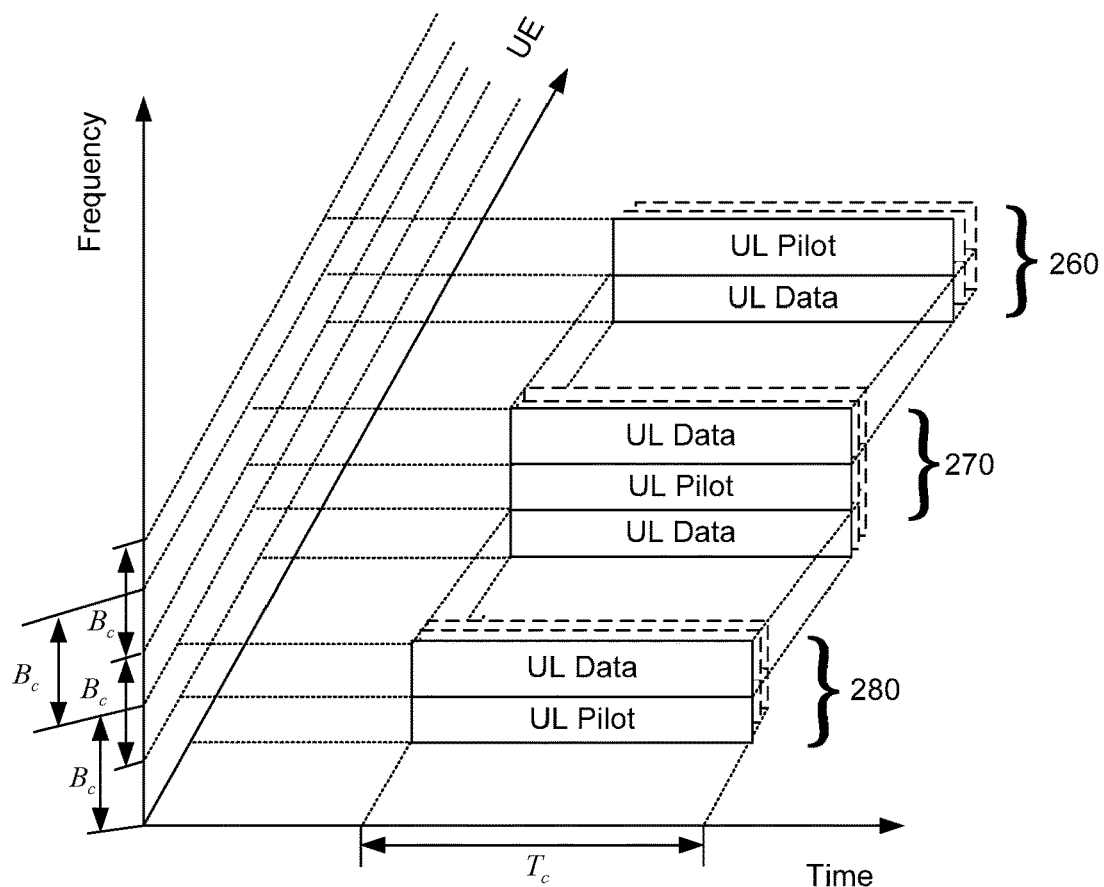
FIG. 4B is a block diagram illustrating a time-frequency resource allocation scheme according to another embodiment of the present invention.

In an alternative embodiment, the first and the second group-specific pilot time-frequency resources do not overlap in frequency domain and at least partly overlap in time domain. That's to say, the time-frequency resources allocated to all the pilot and data sequences at least partly overlap in time domain, as shown in FIG. 4A and FIG. 4B. Common time resources are used by all pilot sequence groups and data sequence groups, utilization efficiency of the time-frequency resources is further increased.

In a further embodiment, for each UE group the group-specific pilot time-frequency resource at least partly overlaps in time domain with the group-specific data time-frequency resource.

In another further embodiment, for each UE group the group-specific pilot time-frequency resource is prior to or after the group-specific data time-frequency resource in one of time domain and frequency domain. Accordingly, the processor 941 may further allocate a partial blanking in the other domain for the pilot sequences from the UEs comprised in at least one UE group of the plurality of UE groups, FIGS. 5A, 5B and 5C, not limited just an example, show allocating a partial blanking in frequency domain. The sum of a length of the partial blanking and a length of the corresponding pilot sequences in the other domain is equal to a length of the corresponding data sequences in the other domain.

Figure 5A:
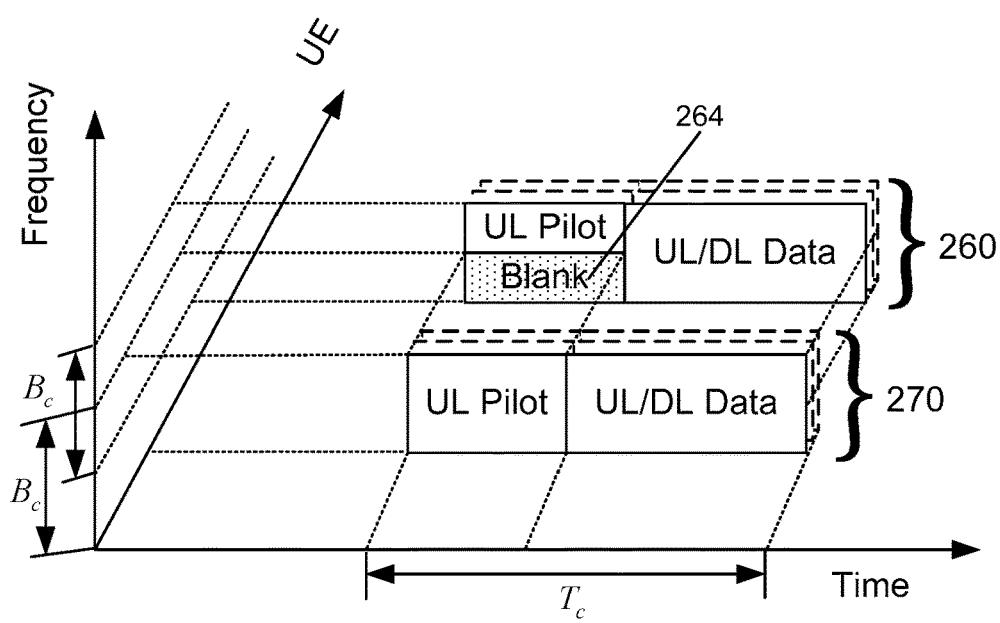
FIG. 5A is a block diagram illustrating a time-frequency resource allocation scheme according to another embodiment of the present invention.
Figure 5B:
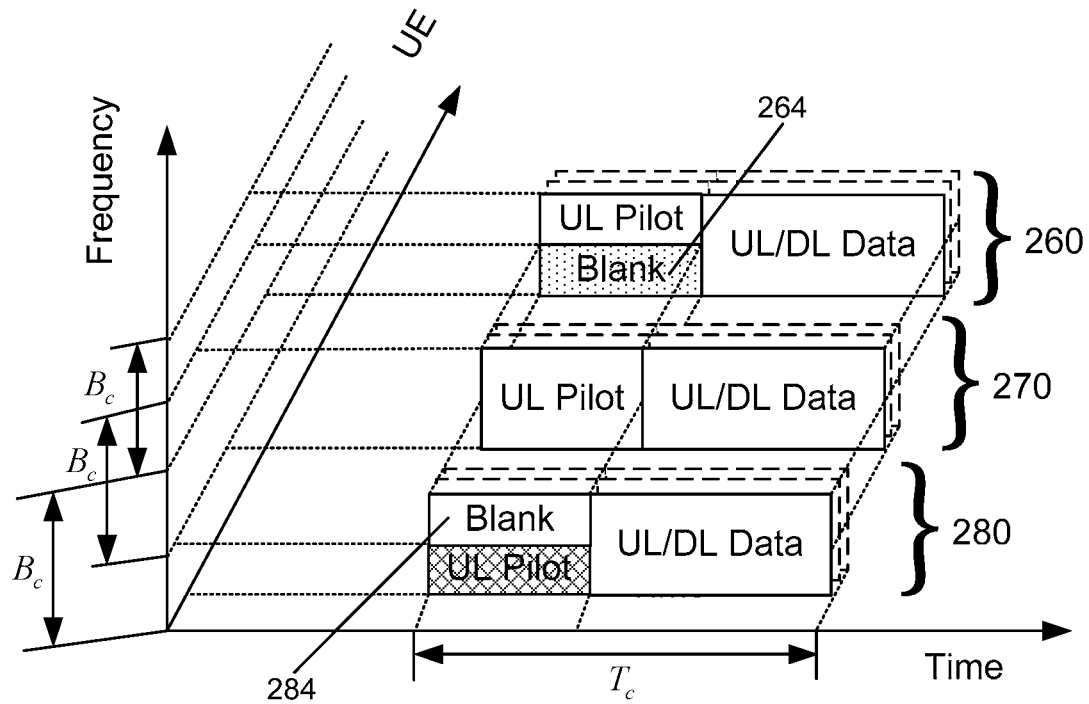
FIG. 5B is a block diagram illustrating a time-frequency resource allocation scheme according to another embodiment of the present invention.

For it is normally required to transmit the pilot sequence before the downlink data sequence. When the group-specific pilot time-frequency resource is prior to the group-specific data time-frequency resources in time domain, both the downlink and uplink data sequences transmission in the group-specific data time-frequency resources are allowed. In FIG. 5A, the resources allocated to pilot sequences are prior to the data sequences, so the resources allocated to data sequences can be used for both receiving and transmitting data, i.e. uplink (UL) data and downlink (DL) data, shown as UL/DL Data in the figure. FIG. 5B differs from FIG. 5A that the UEs are grouped into three UE groups, and two partial blanking are allocated to two of the UE groups, respectively.

Partial blanking is used to achieve frequency shift, in order to avoid pilot contamination between the UE groups. In other words, overlapped regions for pilot sequences of different pilot sequence groups are filled by partial blanking, by doing this, pilot contamination between the UE groups.

Figure 3B:
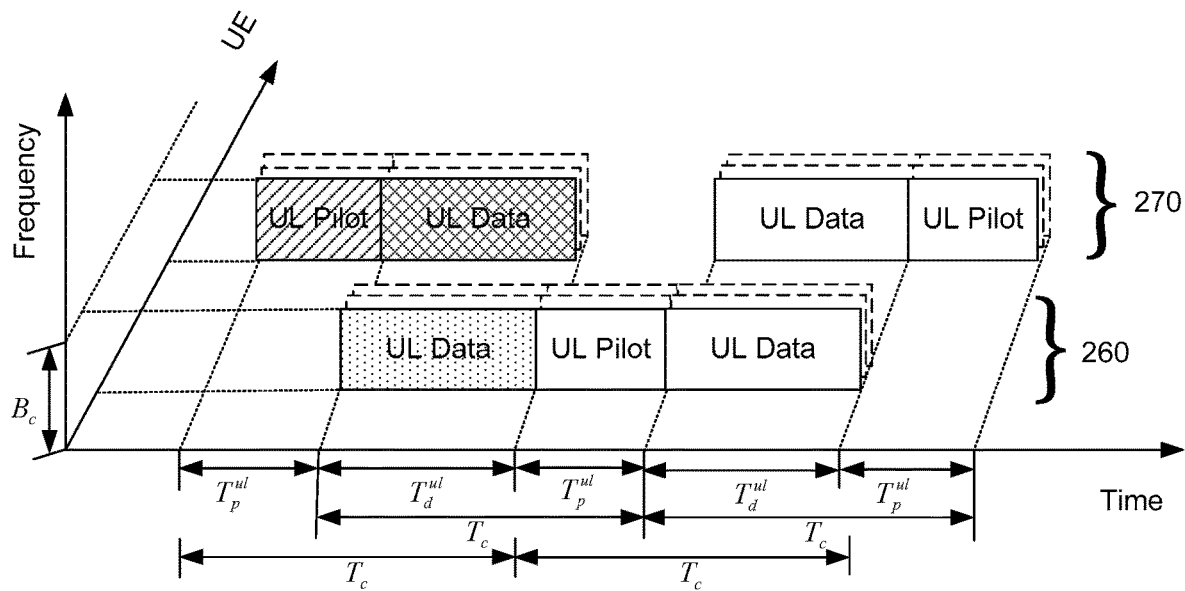
FIG. 3B is a block diagram illustrating a time-frequency resource allocation scheme according to another embodiment of the present invention.
Figure 3C:
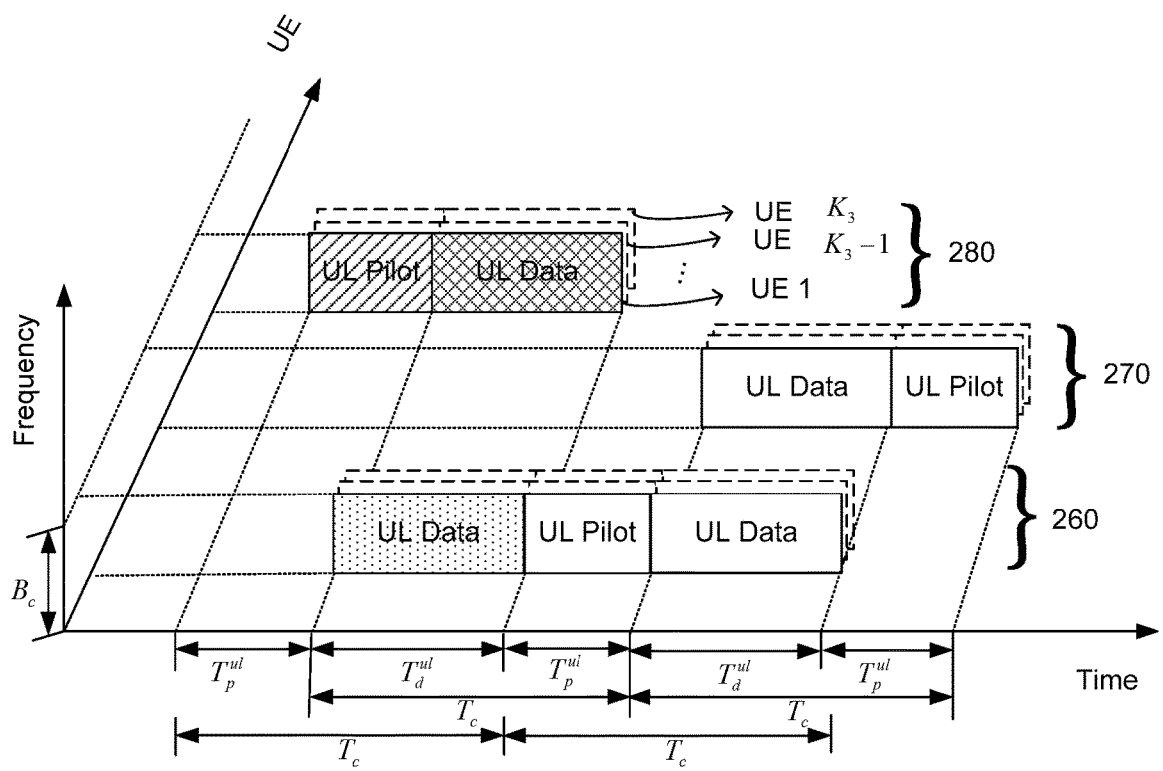
FIG. 3C is a block diagram illustrating a time-frequency resource allocation scheme according to another embodiment of the present invention.
Figure 5C:
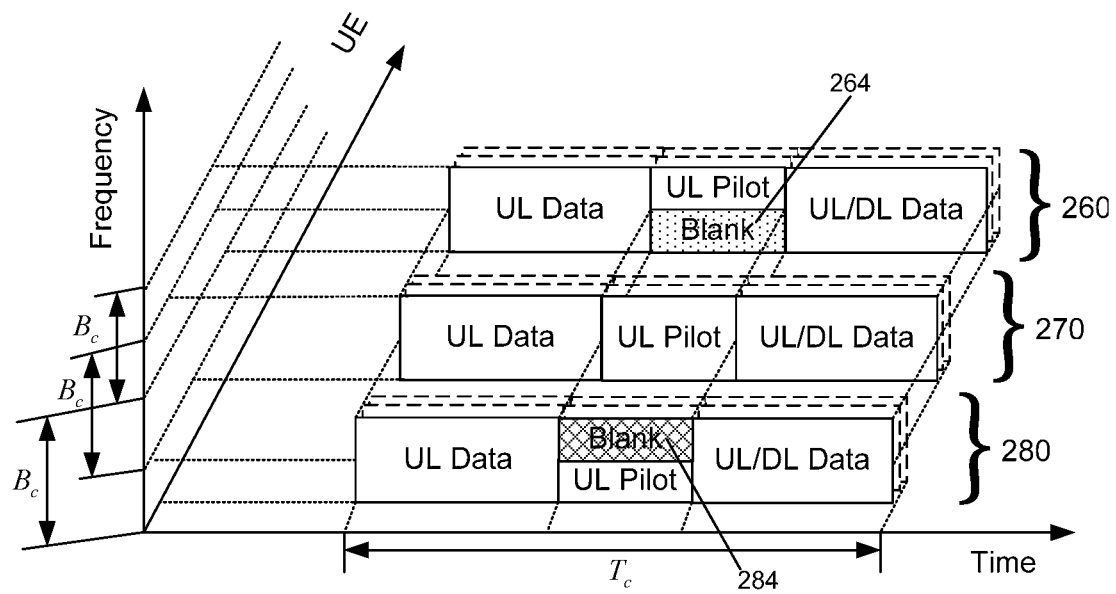
FIG. 5C is a block diagram illustrating a time-frequency resource allocation scheme according to another embodiment of the present invention.

In another embodiment, the processor 941 may further, for at least one UE group, allocates additional group-specific data time-frequency resource to data sequences associated to UEs comprised in the UE group. This can be performed for only one UE group, like UE group 270 according to the embodiment shown in FIG. 4B. This can also be performed for more than one UE group, like UE groups 260 and 270 shown in FIGS. 3B and 3D, UE groups 260 and 280 shown in FIG. 3C, and UE groups 260, 270 and 280 shown in FIG. 5C. When it is performed for more than one UE group, group-specific data time-frequency resources may at least partly overlap in time domain as shown in FIGS. 3B, 3C and 5C. Specifically, in an embodiment according to FIG. 3C, the processor 941 may further allocate a third group-specific data time-frequency resource (shown in dot pattern) to data sequences associated to UEs comprised in the first UE group 260; a fourth group-specific data time-frequency resource (shown in grid pattern) is allocated to data sequences associated to UEs comprised in the second UE group 280. The third and the fourth group-specific data time-frequency resources at least partly overlap in time domain.

FIG. 5C shows an embodiment wherein, an additional resource is allocated to data sequences for each UE group. As discussed before, a group-specific data time-frequency resource can be used either for receiving uplink or sending downlink data sequences. FIG. 5C illustrates an example of receiving uplink data sequences for the allocated group-specific pilot time-frequency resource is after the additionally allocated group-specific data time-frequency resource in time domain.

To have an accurate channel estimation for UEs, the size of subframe in the time-frequency should the less than $B_c \times T_c$. The ideal situation is that all data sequences and pilot sequences associating to one UE group are within one subframe, i.e., for each UE group, the sum of the all group-specific data time-frequency resources allocated to data sequences and the group-specific pilot time-frequency resources allocated to pilot sequences are less than $B_c \times T_c$.

In another embodiment, the processor 941 may further update the grouping of UEs, the assigning of pilot sequences, the assigning of partial blanking, based on user mobility, channel conditions, active number of UEs within range and transmission load. By updating and re-performing the grouping of UEs continuously, or at certain predetermined time intervals, the grouping and assignment of resources may be continuously optimised and compensation for UEs movement within the cell may be made.

In another embodiment, the processor 941 may further coordinate reception and transmission at a plurality of access node 210s, associated with the controller 940 in Coordinated Multi-Point, CoMP, transmissions. Thereby communication of a UE via a plurality of access node 210s in CoMP transmissions is enabled.

In another embodiment, the processor 941 may further instruct at least one UE to adjust transmission power, based on at least one of channel estimation of each UE group. The quality of channel estimation quality plays a key role on the performance of the wireless communication system. One way to optimise the performance of the wireless communication system is to perform closed loop power control where the power control is done based on the uplink pilot symbol. For the disclosed construction it is desirable that to have variable average power allocation on the pilot and the data symbols where the power allocation varies over different UE groups.

In an embodiment, the controller 940 as above can be a part of an access node 210, can also be in a form of independent from an access node 210. When the controller 940 is not a part of an access node 210, wherein the controller 940 further comprises a transmitter 942 transmits a signal informing an access node 210 of the allocated group-specific pilot time-frequency resources, the allocated group-specific data time-frequency resources and the allocated partial blanking.

The expressions "wireless communication network", "wireless communication system" and/or "cellular telecommunication system" may within the technological context of this disclosure sometimes be utilised interchangeably.

The controller 940, access node 210, and the UEs are comprised in a wireless communication network. The wireless communication network may be based on 3GPP LTE. Further, the wireless communication network may be configured to operate according to the TDD principle and in the description and associated figures, embodiments are described in a TDD environment. However, some embodiments may be based on, or implemented in a Frequency Division Duplex (FDD) environment. TDD is an application of time-division multiplexing to separate uplink and downlink signals in time, possibly with a Guard Period (GP) situated in time domain between the uplink and downlink signalling and/or between the pilot region and data region. FDD means that the transmitter 942 and receiver operate at different carrier frequencies.

The present invention discloses a new time-frequency resource allocation scheme which allocating group-specific data time-frequency resources which at least partly over-lap in time domain for data sequences of each UE group.

Optional, the time-frequency resource allocation scheme may further comprise allocating group-specific pilot time-frequency resources which do not overlap at least in one of frequency domain and time domain for pilot sequences of each UE group. The resource allocation scheme according to FIG. 3A introduces only additional interferences among the data symbols. However, this additional inter-UE interference can be combated using the spatial filtering, i.e., estimation of the vector channel of each UE and performing data separation in the signal space that is spanned by the estimated spatial channels. The spatial filtering can be made simple without any Successive Interference Cancellation (SIC) operation if the size the mMIMO array is chosen appropriately. To further illustrates different embodiments of the time-frequency resource allocation scheme, the following Figures are described in detail.

FIG. 3A illustrates a time-frequency resource allocation scheme for data and pilot sequences according to an embodiment of the present invention. A principle of this time-frequency resource allocation scheme is that allocating at least partly overlapping in time domain group-specific data time-frequency resources for data sequences of each UE group, and allocating group-specific pilot time-frequency resources which do not overlap at least in one of frequency domain and time domain for pilot sequences of each UE group, wherein for each UE group the group-specific pilot time-frequency resource is either prior to or after the group-specific data time-frequency resource.

According to this embodiment, UEs are grouped into two UE groups. A $1^{st}$ UE group 260 contains a quantity of $K_1$ UEs, shown as UE1, ..., UE$K_1$-1, and UE$K_1$. A second UE group 270 contains $K_2$ number of UEs, i.e., UE1, ..., UE$K_2$-1, and UE$K_2$.

This embodiment takes UL data and UL pilot as an example, for the data is transmitted before the pilot in the second group 270. Hence the $1^{st}$ UE group 260 the data sequences associated UE1, ..., UE$K_1$-1, and UE $K_1$ are UL data sequences, the pilot sequences from UE1, ..., UE$K_1$-1, and UE $K_1$ are UL pilot sequences. The same applies to the $2^{nd}$ UE group 270. The data sequence and pilot sequence are therefore shown as UL Data and UL Pilot, respectively, in FIG. 3A.

The time-frequency resources, name resources in short, are allocated to data and pilots per UE group. The resources allocated to data overlap in time domain, not necessary but in this specific embodiment they also overlap in frequency domain. The time duration of the resource allocated for UL Data from the $1^{st}$ UE group 260 $T_{d,1}^{ul}$ is one resource element shorter than that of the $2^{nd}$ UE group 270 $T_{d,2}^{ul}$, the time durations of UL pilot from the $1^{st}$ UE group 260 $T_{p,1}^{ul}$ is one resource element longer than that of the $2^{nd}$ UE group 270 $T_{p,2}^{ul}$. Further $T_{d,i}^{ul}+T_{p,i}^{ul}=T_{c,i}$, where $T_{d,i}^{ul}$ donates the time duration of the resource allocated for UL Data from UE group i, $T_{p,i}^{ul}$ donates the time duration of the resource allocated for UL pilot from UE group i, $T_{c,i}$ is the coherence time with respect to UE group i, i=1,2. For each UE group i, $T_{d,i}^{ul}+T_{p,i}^{ul}$ should be no more than the coherence time $T_{c,i}$, i.e., $T_{d,i}^{ul}+T_{p,i}^{ul} \leq T_{c,i}$. For each UE group i, all UEs have the same time duration of the resource allocated for uplink data $T_{d,i}^{ul}$, and the same a time duration of the resource allocated for uplink pilot $T_{p,i}^{ul}$.

Each UE in each UE group employs orthogonal pilots, the pilot is also referred to as pilot sequence or pilot symbol. That's to say, the pilot sequences assigned to the UEs are mutually have the inner product of zero within one UE group. Specifically, that is $<s_{ik}, s_{il}>=0$, where $s_{ij}$ denotes the pilot sequence of the UE j in the UE group i, where k≠l, i=1, 2. The number of UEs comprised in group i is selected such that $$K_i = \left\lfloor \frac{T_c B_c}{2} \right\rfloor$$

for i=1, 2, $T_c$ is a coherence time and $B_c$ a coherence bandwidth of a radio channel, to optimize the aggregate rate. Therefore by this choice of number of UEs, there are enough orthogonal pilot sequences that can be accommodated where pilot contaminations within each group can be avoided. The resource allocation scheme is described as follows. To allow efficient utilization of the resources and at the same time to avoid pilot contamination, different UE groups place the pilots either prior to or after data symbols, data symbol is also referred to as data sequence, or data, or payload. For longer transmission duration or transmission with wider bandwidth, the same pattern as shown in FIG. 3A can be repeated. By doing this, 50% less resources are used with respect to the conventional TDD for the second group 270.

When the number of antennas comprised in the mMIMO array is very big, this embodiment of the present invention allows increasing the spectral efficiency by 33% (further analysis and evaluations will be discussed later on). The regions labeled as UL pilot and UL data may comprise multiple time-frequency resource elements as illustrated, shown as "one resource element".

In order to focus on illustrating the inter-group resource allocation in the remaining Figures, it is assumed that the resources allocated to data of difference UE groups have the same time duration, the resources allocated to pilot from different UE groups have the same time duration too, however as shown in FIG. 3A the embodiments of the invention are limited to that. Therefore the time duration of the resource allocated for uplink data is all shown as $T_d^{ul}$, the time duration of the resource allocated for uplink pilot is all shown as $T_p^{ul}$. The UEs in one UE group have the same subframe length, also name time duration, which is no more than the coherence time $T_c$, i.e., $T_d^{ul}+T_p^{ul} \leq T_c$. Regarding to resource allocation scheme according to FIG. 3A, the total time duration utilized for data and pilot transmission in a subframe is $T_d^{ul}+2T_p^{ul}$. For mMIMO antenna array, it is optimal to have $T_d^{ul}=T_p^{ul}=0.5T_c$. Since $T_d^{ul}+T_p^{ul} \leq T_c$, the channels of both groups can be estimated by using the pilot symbols without interference, i.e., no pilot contamination. To have an accurate channel estimation for all UEs, the size of subframe in the time-frequency plane should the less than $B_c \times T_c$. This scheme provides 33% gain with respect the conventional TDD.

FIG. 3B illustrates a time-frequency resource allocation scheme for data and pilot sequences according to another embodiment of the present invention. FIG. 3B follows the same principle as FIG. 3A, comparing to FIG. 3A an additional resource (dot pattern region) is allocated to UL data for the first UE group 260, also additional resources (grid pattern region and strip pattern region) are allocated to UL data and UL pilots, respectively, for the second UE group 270.

FIG. 3C illustrates a time-frequency resource allocation scheme for data and pilot sequences according to another embodiment of the present invention. Comparing to FIG. 3A, an additional resource (dot pattern region) is allocated to UL data for the first UE group 260, furthermore one more UE group, a third UE group 280 is illustrated, thereby three UE groups are scheduled. The third UE group 280 comprises a quantity of $K_3$ UEs, shown as UE1, . . . , UEK$_3$-1, and UEK$_3$. The embodiment of FIG. 3C follows the same principle as FIG. 3A when allocating resource for the third UE group 280. The additional resources allocated to UL data for the first and third UE groups 260 (dot pattern region), 280 (grid pattern region) overlap in time domain. The resources, allocated to UL pilots for the first and third UE groups 260, 280 (strip pattern regions) do not overlap in time domain and overlap in frequency domain, for each UE group the group-specific pilot time-frequency resource is either prior to or after the group-specific data time-frequency resources. This embodiment provides 60% gain with respect the conventional TDD.

Figure 3D:
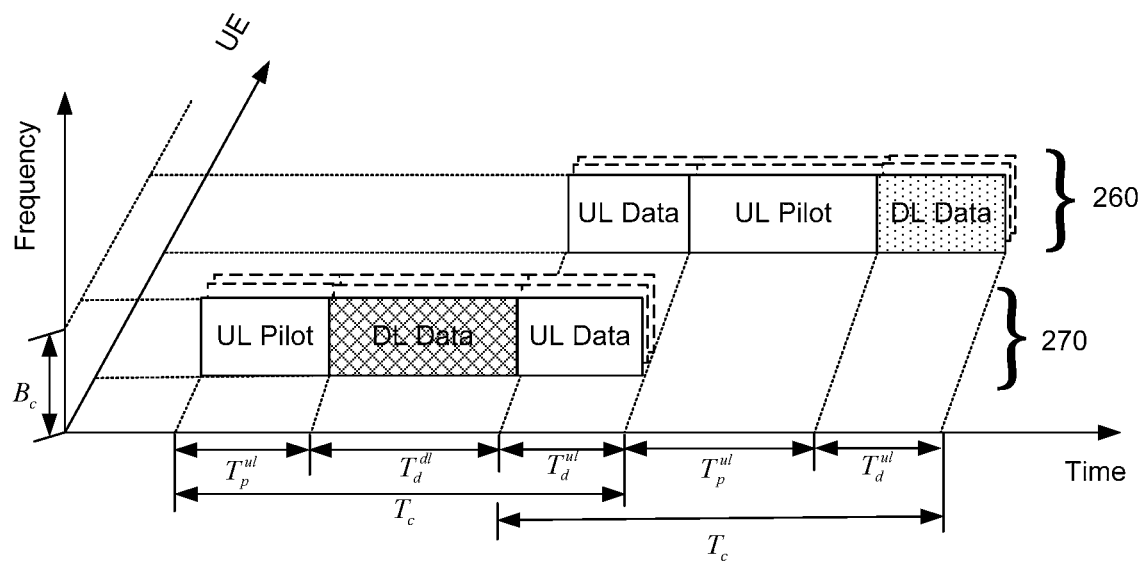
FIG. 3D is a block diagram illustrating a time-frequency resource allocation scheme according to another embodiment of the present invention.

To enable accurate channel estimation for spatial filtering at the access node 210, FIGS. 3A-3C show for each UE group adjacent resources allocated to data and pilot satisfy: $T_d^{ul}+T_p^{ul} \leq T_c$. FIG. 3D illustrates a time-frequency resource allocation scheme for data and pilot sequences according to another embodiment of the present invention. Comparing to FIG. 3A, an additional resource is allocated to data for each UE group, dot pattern for UE group 260 and grid pattern for UE group 270. Thereby two resources are allocated for data, which are used for UL data and DL data, respectively. Both the UL data and DL data use the pilot to do channel estimation. To enable accurate channel estimation for spatial filtering at the access node 210 and for joint beamforming for downlink transmission, $T_d^{ul}+T_d^{dl}+T_p^{ul} \leq T_c$, where $T_d^{dl}$ is a time duration of the resource allocated for DL data.

FIG. 4A illustrates a time-frequency resource allocation scheme for data and pilot sequences according to another embodiment of the present invention. The principle of the time-frequency resource allocation scheme is that allocating group-specific data time-frequency resources overlapping in time domain, group-specific pilot time-frequency resources overlapping in time domain and non-overlapping in frequency domain. For each UE group the group-specific pilot time-frequency resources overlap in time domain with the group-specific data time-frequency resource.

To allow efficient utilization of the resources and at the same time avoid pilot contamination, one of the UE groups, such as 260, places the pilots at the beginning of a sub-band and the other group, like 270, places the pilots at the end of the sub-band. The sub-band consumed for uplink pilot is $B_p^{ul}$ and the sub-band consumed for the uplink data is $B_d^{ul}$ which is shared between the two UE groups 260 and 270. According to this scheme the pilots of different groups do not interfere with each other while the data of different groups are transmitted over overlapping resources in time domain. By doing this way 50% less resources are used with respect to the conventional optimized TDD for the second group 270 when $B_d^{ul}=B_p^{ul}=0.5B_c$. This scheme allows estimating the channels of without any SIC which leads to a simple receiver structure. To accurately estimate the channels of all UEs, the size of subframe should be less than $B_c \times T_c$, where $B_d^{ul}+B_p^{ul} \leq B_c$, $T_d^{ul} \leq T_c$, and $T_p^{ul} \leq T_c$. The scheme according to FIG. 4A introduces only additional interferences among data symbols. However, this inter-UE data interference can be combated using the spatial filtering. The spatial filtering can made simple without any SIC operation if the size of the mMIMO array is chosen appropriately. In particular, when the number of antennas is very high, this scheme by avoiding the pilot contamination as well as scheduling more users allows increasing the spectral efficiency by 33% as compared to the optimized TDD solution.

The same as FIG. 3A, UEs are grouped into two UE groups, which have a quantity of $K_1$ and $K_2$ UEs, respectively. FIG. 4A depicts the basic resource allocation scheme for two groups. FIG. 4B shows a three-group scenario for uplink data. The third UE group 280 comprises a quantity of $K_3$ UEs, shown as UE1, . . . , UEK$_3$-1, and UEK$_3$. The resources for pilots from three UE groups 260, 270 and 280 do not overlap in frequency domain. This case provides 60% gain with respect to the conventional TDD.

In FIGS. 4A-4B, only UL data is illustrated because the pilot symbols are transmitted non-causally with respect to the data. For DL data, it is generally required to transmit the pilot before the data since the data needs to be first precoded by the channel estimation using the pilot.

FIG. 5A illustrates a time-frequency resource allocation scheme for data and pilot sequences according to another embodiment of the present invention. The principle of the time-frequency resource allocation scheme is that allocating group-specific data time-frequency resources overlapping in time domain, group-specific pilot time-frequency resources overlapping in time domain and non-overlapping in frequency domain. For each UE group the group-specific pilot time-frequency resource is either prior to or after in time domain with the group-specific data time-frequency resource. The overlapped region for pilot symbols of UE groups 260 and 270, is filled by partial blanking 264, in order to cancel the pilot contamination between UE groups.

The advantage of this scheme is that the overlapped resource for data are shared by multiple UE groups and it consequently enables a more efficient utilization of the time-frequency resources. The reason behind this is that, the channel estimation becomes interference free and hence the spatial filtering using mMIMO can separate the inter-user interference between multiple UE groups. Also no SIC receiver is required when the number of the antenna array is large enough.

FIGS. 5A and 5B show two embodiments when two and three UE groups are respectively considered.

Comparing to FIG. 5A, the overlapped region for pilot symbols of UE groups 270 and 280, are filled by partial blanking 284 in FIG. 5B.

FIG. 5A illustrates a time-frequency resource allocation scheme for data and pilot sequences according to another embodiment of the present invention. Comparing to FIG. 5B, additional resource is allocated for data of each UE group, which is as an example used for receiving UL Data. To enable accurate channel estimation for spatial filtering at the access node 210 and for joint beamforming for downlink transmission, $T_d^{ul}+T_d^{ul/dl}+T_p^{ul} \leq T_c$, where $T_d^{ul/dl}$ is a time duration of the resource allocated for either UL or DL data, which is shown as UL/DL Data in the figures. In FIG. 5C, uplink data is first transmitted and then pilot symbols and the spatially preceded downlink data are finally transmitted where the preceding matrices are found using the uplink pilot symbols and are formed in the similar fashion as that in the conventional TDD. The same as FIG. 3D, to enable accurate estimation, the time duration of time-frequency resources allocated to the data and pilot is less than $T_c$. The embodiments shown in FIGS. 5A and 5B are applicable for either UL or DL data using TDD protocol because the pilot symbols are transmitted prior to the data symbols over shared uplink channels. FIG. 5C shows embodiment that enables transmission of both uplink and downlink data for three UE groups.

Figure 6:
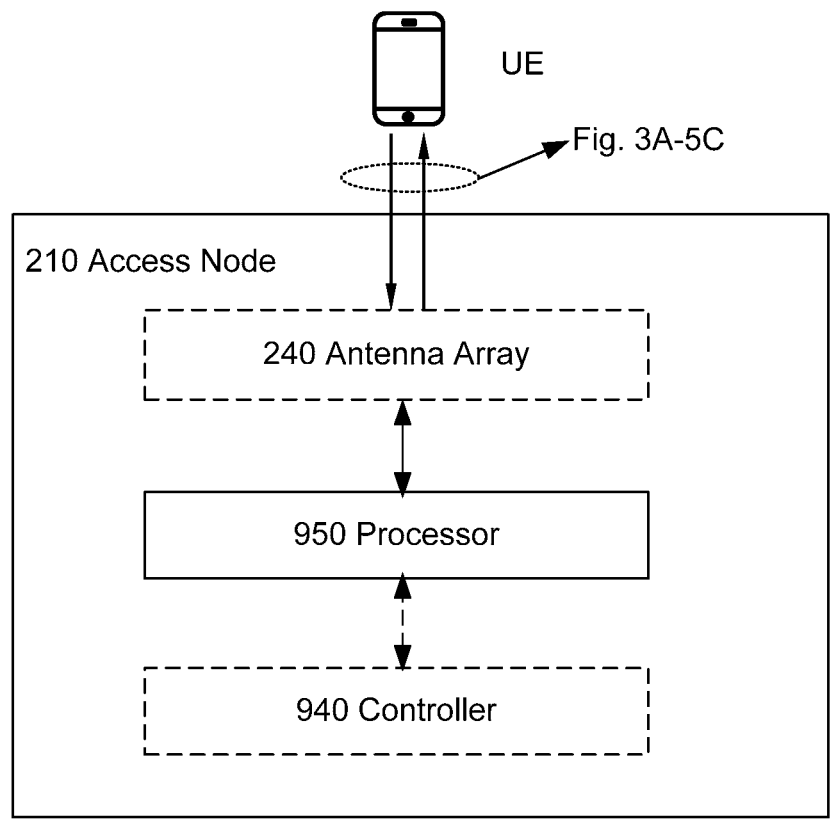
FIG. 6 is a block diagram illustrating an access node according to an embodiment of the present invention.

As show in FIG. 6, the controller 940 in the embodiment according to FIG. 2 can be a part of an access node 210, can also be in a form of independent from an access node 210 940.

As mentioned above when the controller 940 is not a part of an access node 210, it further comprises a transmitter 942 as shown in FIG. 2 transmits a signal informing an access node 210 of the allocated group-specific pilot time-frequency resource, the allocated group-specific data time-frequency resources and the allocated partial blanking.

When the controller 940 is a part of the access node 210, the access node 210 comprises the controller 940, a processor 950. The access node 210 may further comprises, or alternatively connectable to an antenna array 240. The antenna array 240 is configured for massive Multiple-Input Multiple-Output (MIMO) transmission, has at least one antenna transmitting and receiving a signal as shown in FIGS. 3A to 5C from the UEs grouped in each UE group. The antenna array 240 may comprise a multitude of antennas, such as e.g. hundred or more antenna in some embodiments. The multitude of antennas may be mounted at a distance from each other, such that some, several or even all of the antenna are able to receive/transmit the same signal from/to the UEs.

The processor 950 estimates a channel corresponding to each UE in each UE group, based on the pilot sequences from UEs grouped in each UE group. The processor 950 may further detect the data sequences from the UEs in each UE group.

The processor 950 may further map data sequences to at least one of the first, the second, the third and the fourth group-specific data time-frequency resources which is after the corresponding group-specific pilot time-frequency resource in time domain. The antenna is configured to transmit the data sequences to the plurality of UEs.

Meanwhile, it is clear that along with the control and access node 210 embodiments, corresponding method embodiments are disclosed as well.

The new solution is different from the conventional TDD as it schedules more UEs enabled by grouping and using the disclosed resource allocation scheme. The present invention allows redesigning transmission frames such that pilot symbols do not interfere with data symbols. The new solution without a need for a SIC receiver can outperform conventional TDD almost over entire range of number of antennas. It additionally has the same complexity as that of the conventional TDD.

To show the benefits of this invention, Table 1 summarizes the main features according to the present invention and the conventional TDD. The gain in spectral efficiency is computed with respect to the conventional TDD when the access node 210 has an infinite number of antennas. The disclosed aligned TDD solution provides a decent gain without any need for SIC it hence renders a low complexity implementation of the receiver. The gain in Table 1 is computed when the optimal number of UE is scheduled and the access node 210 has access to a high number of antenna elements.

TABLE 1

| Scheme | No. of UEs | Gain in spectral efficiency |
| --- | --- | --- |
| Conventional TDD | $\frac{1}{2}B_cT_c$ | — |
| Embodiment shown in FIG. 3A | $B_cT_c$ | 33% |
| Embodiment shown in FIG. 3C | $1.5B_cT_c$ | 60% |

Figure 7A:
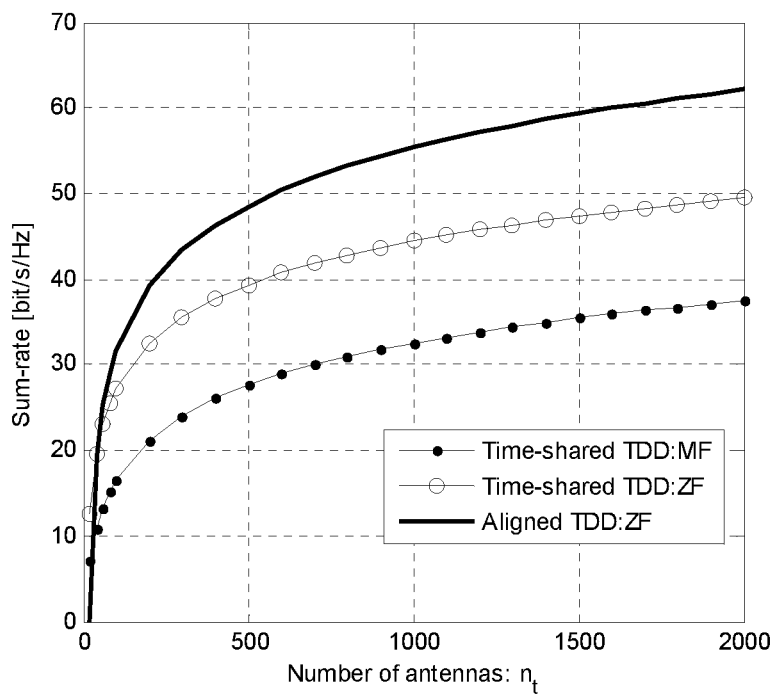
FIG. 7A is a diagram illustrating the sum-rate change along with the number of antennas comparing an embodiment of the present invention with the conventional art.

FIG. 7A illustrates the sum-rate change along with the number of antennas $n_t$, comparing the embodiment of the present invention with the conventional art time shared TDD Zero-Forcing (ZF) and TDD Matched Filtering (MF). Consider the sum-rate of the invention over Rayleigh fading radio channels whose coherence time $T_c=20$, i.e. the number of symbols for which the channel approximately remains unchanged is 20. It is assumed that the average channel gain from each UE to the antenna array 240 is normalized to one. For the sum-rate 50 [bit/s/Hz], by setting the spatial filtering to be ZF, the present invention demands for 600 antennas while the conventional TDD ZF solution requires nearly 2000 antennas, the conventional TDD MF solution requires even more than 2000 antennas. Therefore by using the present invention, the number of antenna is significant reduced when achieving the same sum-rate.

Figure 7B:
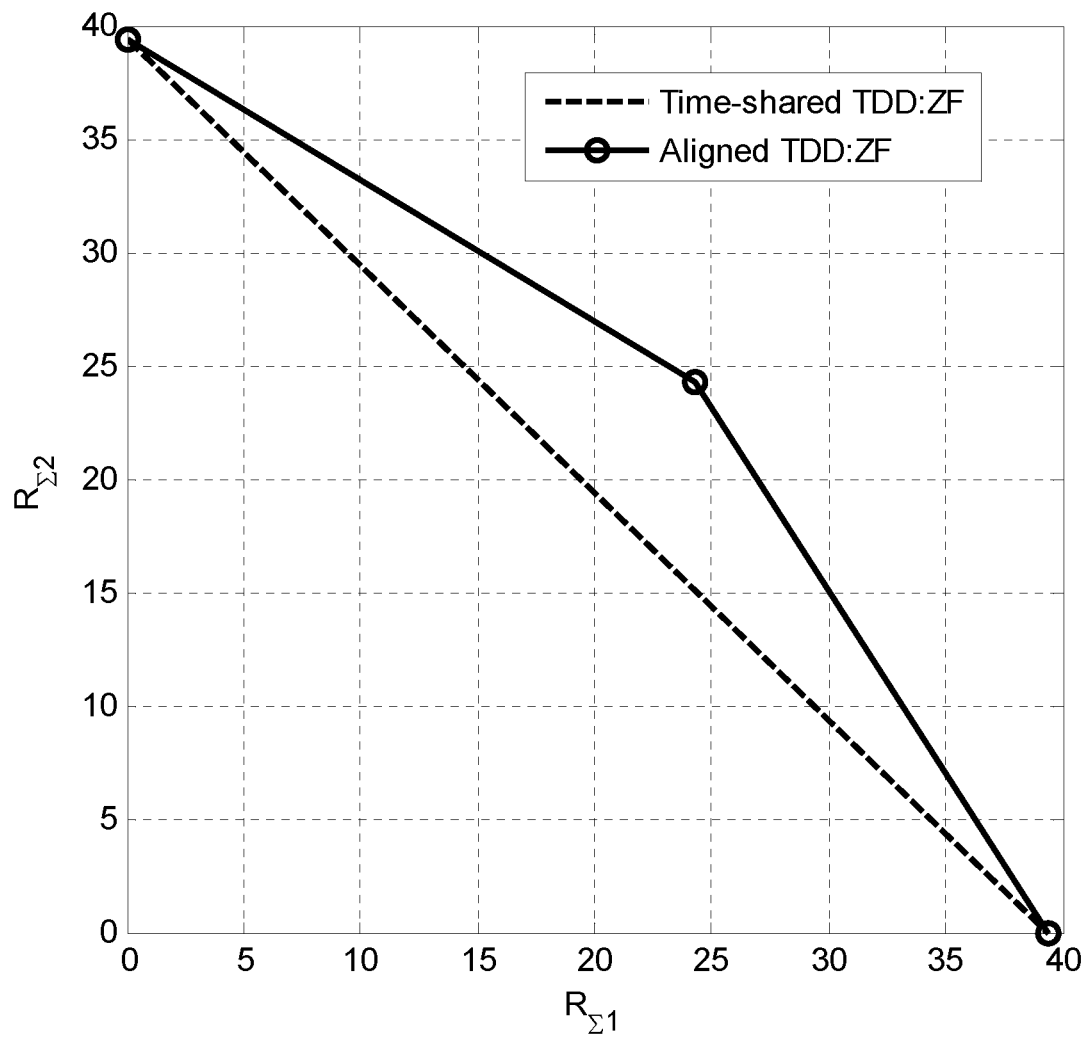
FIG. 7B is a diagram illustrating the rate region comparing an embodiment of the present invention with the conventional art.

FIG. 7B illustrates the rate region comparing the embodiment of the present invention with the conventional art time shared TDD Zero-Forcing (ZF) when two UE groups are scheduled. The rate region is a subset of the real Euclidean space of two dimensions, the sum-rates achievable for the UEs in two UE groups. The conventional TDD ZF, can be used to schedule both UE groups using time-sharing. This results to a rate region $(R_{\Sigma 1}, R_{\Sigma 2})$, where $R_{\Sigma 1}$ indicates the sum-rate achievable for the UEs in the first group 260 and $R_{\Sigma 2}$ indicates the achievable for the UEs in the second group 270. The rate region for the same parameters as that for FIG. 7A for the antenna number $n_t=500$ with ZF. The rate region is notably enlarged according to the present invention, with respect to mMIMO rate region obtained by time-sharing of the two groups using the conventional time shared TDD ZF.

The access node 210 may be referred to, respectively, as e.g., a network node, a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the UEs over a wireless interface, depending, e.g., of the radio access technology and/or terminology used.

The UE may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the access node 210, according to different embodiments and different vocabulary.

Figure 8A:
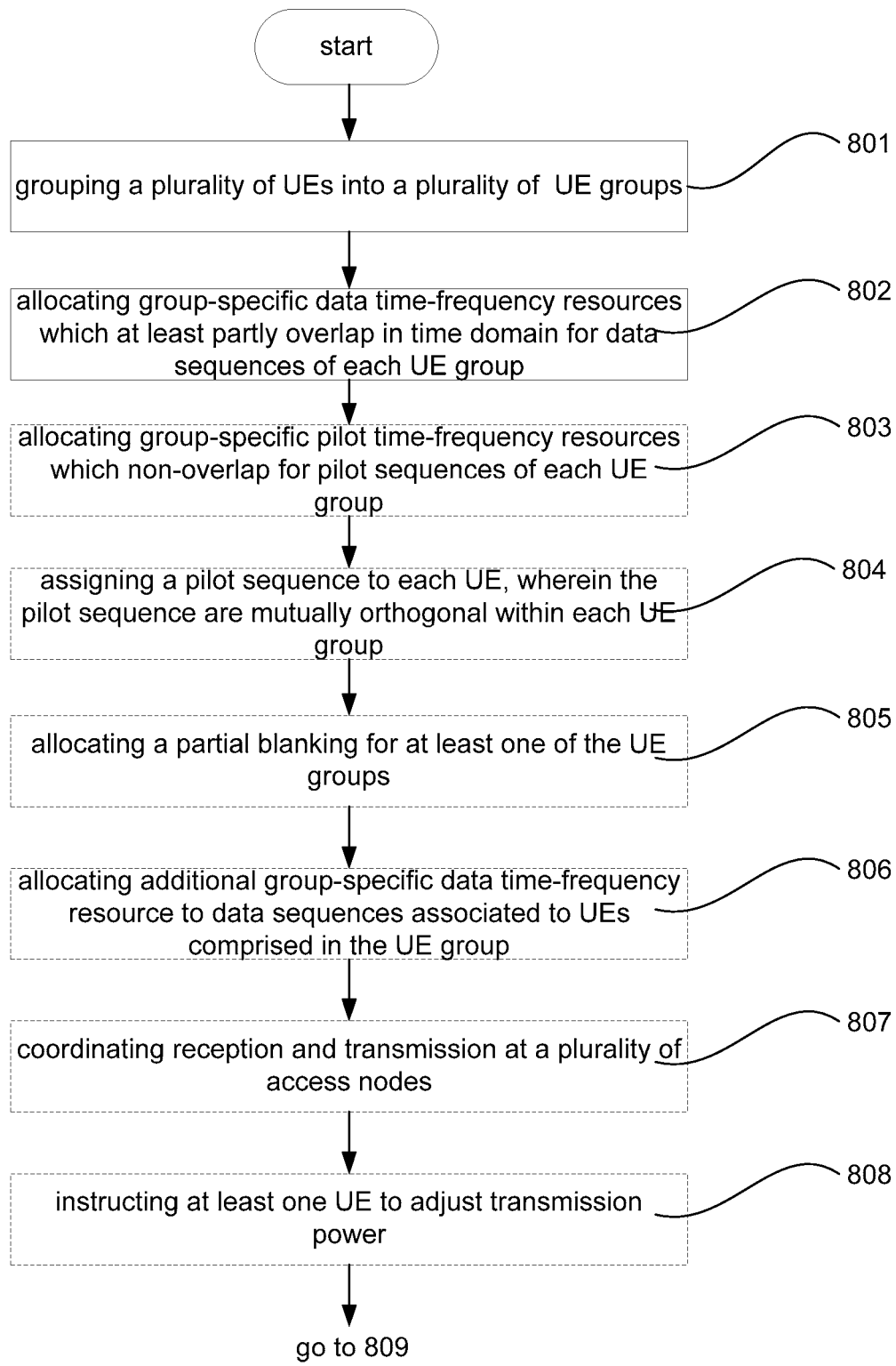
FIG. 8A and FIG. 8B are a is a flowchart showing a method for allocating time-frequency resources according to an embodiment of the present invention.
Figure 8B:
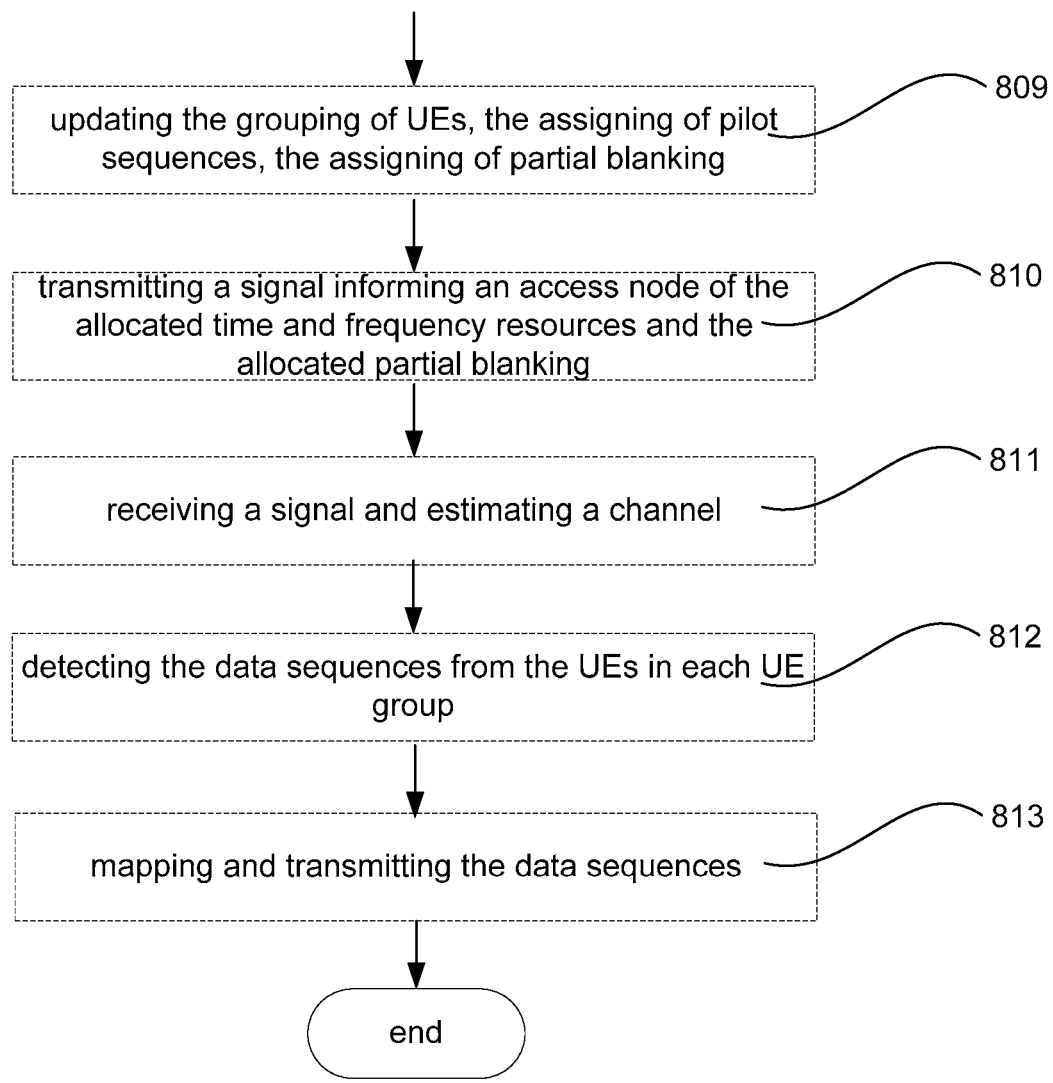

FIG. 8A and FIG. 8B are a flowchart illustrating a method for allocating time-frequency resources a method for allocating time-frequency resources. The method may be performed in the controller 940 or access node 210 of a wireless communication network.

It is however to be noted that any, some or all of the described actions 801-813, may be performed in a somewhat different chronological order than the enumeration indicates, be performed simultaneously or even be performed in a completely reversed order according to different embodiments. For instance, such as actions 802, 803, 804, 805, 806, 807 may be performed in any order. Some of the actions 801-813, such as actions 801-810 are performed by the controller 940 when the controller 940 is a physical entity independent from the access node 210, the remaining actions 811-813 are performed by the access node 210. Some of the actions 801-813 are only performed by the access node 210, not the controller 940 when the controller 940 is physically a part of the access node 210, such as actions 801-809 and 811-813. Further, it is to be noted that some actions may be performed in a plurality of alternative manners according to different embodiments, and that some such alternative manners may be performed only within some, but not necessarily all embodiments. The method comprise the following actions:

Action 801

Grouping a plurality of UEs into a plurality of UE groups, for instance, a first UE group 260 and a second UE group 270.

The total number of UEs may be any arbitrary integer >1. Also the number of UE groups 260, 270 may be any arbitrary integer >1. The number of UEs grouped in each of the UE groups 260, 270 may be any arbitrary integer >1.

The grouping may in some embodiments be based on a coherence time $T_c$ and a coherence bandwidth $B_c$ of radio channels, for instance, grouping a maximum number of UEs in each group less than $0.5\ T_c \times B_c$.

The grouping of the plurality of UEs into a plurality of UE groups, may in some embodiments be based on cell location of each UE. For instance, the UEs situated within a Macro cell may be grouped in the first UE group 260, and UEs situated within a virtual Pico cell may be grouped in the second UE group 270.

In some embodiments the grouping of the plurality of UEs into a plurality of UE groups, may be based on Channel Quality Index, CQI, for instance, UEs associated with a CQI lower than a threshold value are grouped in the first UE group. As an example, the grouping of the UEs is based on received signal strength, wherein UEs associated with a received signal strength lower than a threshold value may be grouped in the first UE group 260 while UEs associated with a received signal strength exceeding the threshold value may be grouped in the second UE group 270.

Action 802

Allocating group-specific data time-frequency resources which at least partly overlap in time domain for data sequences of each UE group.

Specifically, allocating a first group-specific data time-frequency resource to data sequences associated to UEs comprised in the first UE group 260; and allocating a second group-specific data time-frequency resource to data sequences associated to UEs comprised in the second UE group 270; wherein the first and the second group-specific data time-frequency resources at least partly overlap in time domain.

If we say data sequences associated to the UEs comprised in one UE group form a data sequence group, the resource is allocated per data sequence group, the data sequences comprised in one data sequence group are allocated the same time-frequency resources. A data sequence associated to a UE can be a downlink data sequence which transmits the UE; can also be an uplink data sequence receiving from the UE.

The time-frequency resource comprises a plurality of time-frequency resource elements. The time-frequency resources at least partly overlap, in other words, not necessary all, but at least some of the time-frequency resource elements are in common in time domain. Data sequences in one data sequence group are of the same time length, however those in different data sequence groups are not necessary in the same time length. When data sequences in different data sequence groups are of different length, they are allocated different number of resource elements. As shown in FIG. 3A, the second data sequence group is one resource element longer than the first data sequence group in time domain, while four resource elements in time domain are in common for data sequence groups.

Action 803

This action may be performed only in some embodiments.

Allocating group-specific pilot time-frequency resources which do not overlap at least in one of frequency domain and time domain for pilot sequences of each UE group.

Specifically, allocate a first group-specific pilot time-frequency resource for pilot sequences from the UEs comprised the first UE group 260; and to allocate a second group-specific pilot time-frequency resource for pilot sequences from the UEs comprised in the second UE group 270, wherein the first and the second group-specific pilot time-frequency resources do not overlap at least in one of frequency domain and time domain.

If we say those pilot sequences sent from the UEs comprised in one UE group form a pilot sequence group, the group-specific pilot time-frequency resources allocation is performed for each pilot sequence group, the pilot sequences comprised in one pilot sequence group are allocated the same time-frequency resources.

For a time-frequency resource is in two dimensions, i.e., time domain and frequency domain, as long as two time-frequency resources do not overlap in one of the two domains, the time-frequency resources are non-overlapping. In an embodiment, the group-specific pilot time-frequency resources do not overlap in time domain and at least partly overlap in frequency domain. While in an alternative embodiment, the group-specific pilot time-frequency resources do not overlap in frequency domain and at least partly overlap in time domain.

The pilot sequences in one pilot sequence group are of the same time length, however those in different pilot sequence groups are not necessary in the same time length. The length of a pilot sequence may depend on at least one of a quantity of UEs in each UE group and a quality of a radio channel estimation. For example, when the number of UEs in each UE group is different, the length of pilot sequences may be different. In FIG. 3A, there are K1 and K2 number of UEs in the first and second UE groups 260, 270, the first pilot sequence group is one resource element in time domain longer than the second pilot sequence group.

In some embodiment, the first and the second group-specific pilot time-frequency resources do not overlap in time domain and at least partly overlap in frequency domain. Alternatively, the first and the second group-specific pilot time-frequency resources do not overlap in frequency domain and at least partly overlap in time domain. When the first and the second group-specific pilot time-frequency resources do not overlap in frequency domain and at least partly overlap in time domain, for each UE group the group-specific pilot time-frequency resources at least partly overlap with, or prior to, or after in time domain the group-specific data time-frequency resource.

Action 804

This action may be performed only in some embodiments.

Assigning a pilot sequence to each UE, wherein the pilot sequence are mutually orthogonal within each UE group.

Pilot sequences of mutually orthogonal pilot sequences may be assigned to the first UE group 260 which are reusable by UEs in the second UE group 270 in some embodiments.

By grouping UEs into different UE groups and reusing pilot sequences in a different UE group is enabled, more UEs can be scheduled for uplink pilot transmission in comparison with conventional TDD.

Action 805

This action may be performed only in some embodiments, like those shown in FIGS. 5A, 5B and 5C.

Allocating a partial blanking for at least one of the UE groups 260, 270 and 280. When the first and the second group-specific pilot time-frequency resources do not overlap in frequency domain and at least partly overlap in time domain, for each UE group the group-specific pilot time-frequency resource is prior to or after the group-specific data time-frequency resource in one of time domain and frequency domain, allocating a partial blanking in the other domain for the pilot sequences from the UEs comprised in at least one UE groups 260, 270 and 280. The sum of a length of the partial blanking and a length of the corresponding pilot sequences in the other domain is equal to a length of the corresponding data sequences in the other domain.

For it is normally required to transmit the pilot sequence before the downlink data sequence. When the group-specific pilot time-frequency resource is prior to the group-specific data time-frequency resources in time domain, both the downlink and uplink data sequences transmission in the group-specific data time-frequency resources are allowed. In FIG. 5A, the resources allocated to pilot sequences are prior to the data sequences, so the resources allocated to data sequences can be used for both receiving and transmitting, shown as UL/DL Data in the figure. FIG. 5B differs from FIG. 5A that the UEs are grouped into three UE groups, and two partial blanking are allocated to two of the UE groups, respectively.

Action 806

This action may be performed only in some embodiments, like those according to FIGS. 3B, 3C, 3D, 4B and 5C.

For at least one UE group, allocating additional group-specific data time-frequency resource to data sequences associated to UEs comprised in the UE group. This action can be performed for only one UE group, like UE group 270 according to the embodiment shown in FIG. 4B. This action can also be performed for more than one UE group, like UE groups 260 and 270 shown in FIGS. 3B and 3D, UE groups 260 and 280 shown in FIG. 3C, and UE groups 260, 270 and 280 shown in FIG. 5C. When this action is performed for more than one UE group, group-specific data time-frequency resources may at least partly overlap in time domain as shown in FIGS. 3B, 3C and 5C.

Take FIG. 3B as example, a third group-specific data time-frequency resource shown as dot pattern is allocated to data sequences associated to UEs comprised in the first UE group 260; and a fourth group-specific data time-frequency resource shown in grid pattern is allocated to data sequences associated to UEs comprised in the second UE group 270. The third and the fourth group-specific data time-frequency resources at least partly overlap in time domain.

Additional, in some embodiment, for at least one UE group, also allocating additional group-specific pilot time-frequency resource to pilot sequences associated to UEs comprised in the at least one UE group, as shown in strip pattern of FIGS. 3B and 3C. To avoid pilot contamination, the same allocation principle as FIG. 3A is applied, i.e., this additional allocated group-specific pilot time-frequency resource do not overlap with other group-specific pilot time-frequency resource already allocated.

Action 807

This action may be performed only in some embodiments.

Coordinating reception and transmission at a plurality of access node 210s, associated with the method in Coordinated Multi-Point, CoMP, transmissions.

Action 808

This action may be performed only in some embodiments.

Instructing at least one UE to adjust transmission power, based on at least one of channel estimation of each UE group.

Action 809

Updating the grouping of UEs, the assigning of pilot sequences, the assigning of partial blanking, based on user mobility, channel conditions, active number of UEs within range and transmission load.

Action 810

This action may be performed only in some embodiments.

Transmitting, when the method is not performed by the controller 940, not the access node 210, a signal informing the access node 210 of the allocated group-specific pilot time-frequency resource, the allocated group-specific data time-frequency resources and the allocated partial blanking.

Action 811

This action may be performed only in some embodiments.

Receiving a signal comprising the data sequences and the assigned pilot sequences from the UEs grouped in each UE group 260, 270 and estimating a channel corresponding to each UE based on the received pilot sequences.

Action 812

Detecting the data sequences from the UEs in each UE group.

Action 813

This action may be performed only in some embodiments.

Mapping the data sequences to at least one of group-specific data time-frequency resources which is after the corresponding group-specific pilot time-frequency resource in time domain; and transmitting the data sequences to the plurality of UEs.

Thus a computer program comprising program code for performing the method according to any of the actions 801-813, may perform wireless communication with UEs in a wireless communication system 200, when the computer program is loaded into the processor 941 of the controller 940 or the processor 950 of the access node 210.

Thereby a computer program product may comprise a computer readable storage medium storing program code thereon for use by a controller 940 or an access node 210, for wireless communication with UEs in a wireless communication system. The program code comprising instructions for executing the method according the FIG. 8A and FIG. 8B.

The computer program product mentioned above may be provided for instance in the form of a data carrier carrying computer program code for performing at least some of the actions 801-813 according to some embodiments when being loaded into the processor 941 or 950. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the controller 940 or the access node 210 remotely, e.g., over an Internet or an intranet connection.

Some embodiments of the disclosed method may be applicable in systems combined with multi-carrier modulations, such as OFDM transmission.

The terminology used in the description of the embodiments as illustrated in the accompanying drawings is not intended to be limiting of the described method and/or apparatus. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor 941 may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A controller comprising:
   a processor; and
   a memory storing processor-executable instructions, and coupled to the processor;
   wherein the processor when executing the processor-executable instructions, is configured to:
      group a plurality of User Equipments (UEs), into a plurality of UE groups;
      allocate a first group-specific data time-frequency resource to data sequences associated with UEs comprised in a first UE group of the plurality of UE groups;
      allocate a second group-specific data time-frequency resource to data sequences associated with UEs comprised in a second UE group of the plurality of UE groups;
      wherein the first and the second group-specific data time-frequency resources at least partly overlap in time domain;
   wherein the processor is further configured to:
      allocate a first group-specific pilot time-frequency resource for pilot sequences from the UEs comprised in the first UE group; and
      allocate a second group-specific pilot time-frequency resource for pilot sequences from the UEs comprised in the second UE group;
      wherein the first and the second group-specific pilot time-frequency resources do not overlap at least in one of frequency domain and the time domain; and
   wherein for each UE group, a group-specific pilot time-frequency resource is prior to or after a group-specific data time-frequency resource in one of the time domain and the frequency domain;
   wherein the processor is further configured to:
   allocate a partial blanking in another domain for corresponding pilot sequences from UEs comprised in at least one UE group of the plurality of UE groups;
   wherein a sum of a length of the partial blanking and a length of the corresponding pilot sequences in another domain is equal to a length of data sequences in the another domain.

2. The controller according to claim 1, wherein the processor is further configured to:
   assign a pilot sequence to each UE, wherein within each UE group pilot sequences are mutually orthogonal.

3. The controller according to claim 1, wherein the first and the second group-specific pilot time-frequency resources do not overlap in the time domain and at least partly overlap in the frequency domain.

4. The controller according to claim 1, wherein the first and the second group-specific pilot time-frequency resources do not overlap in the frequency domain and at least partly overlap in the time domain.

5. The controller according to claim 4, wherein for each UE group, a group-specific pilot time-frequency resource at least partly overlaps in the time domain with a group-specific data time-frequency resource.

6. The controller according to claim 1, wherein the processor is further configured to:
   allocate, for at least one UE group, an additional group-specific data time-frequency resource to data sequences associated to UEs comprised in the at least one UE group.

7. The controller according to claim 1, wherein the processor is further configured to:
   group a quantity of UEs in each UE group based on a coherence time and a coherence bandwidth of a radio channel.

8. The controller according to claim 1, wherein the processor is configured to: group the plurality of UEs into at least the first UE group and the second UE group, based on cell location of each UE.

9. The controller according to claim 1, wherein the processor is further configured to: instruct at least one UE to adjust transmission power, based on at least one channel estimation of each UE group.

10. An access node, comprising a controller and an antenna array having at least one antenna, wherein the controller comprises:
    a processor; and
    a memory storing processor-executable instructions, and coupled to the processor;
    wherein the processor when executing the processor-executable instructions, is configured to:
       group a plurality of User Equipments (UEs), into a plurality of UE groups;
       allocate a first group-specific data time-frequency resource to data sequences associated with UEs comprised in a first UE group of the plurality of UE groups;
       allocate a second group-specific data time-frequency resource to data sequences associated with UEs comprised in a second UE group of the plurality of UE groups;
       wherein the first and the second group-specific data time-frequency resources at least partly overlap in time domain;
    wherein the processor is further configured to:
       allocate a first group-specific pilot time-frequency resource for pilot sequences from the UEs comprised in the first UE group; and
       allocate a second group-specific pilot time-frequency resource for pilot sequences from the UEs comprised in the second UE group;
       wherein the first and the second group-specific pilot time-frequency resources do not overlap at least in one of frequency domain and the time domain;

wherein the antenna array is configured to receive a signal comprising data sequences and assigned pilot sequences from UEs grouped in each UE group; and wherein for each UE group, a group-specific pilot time-frequency resource is prior to or after a group-specific data time-frequency resource in one of the time domain and the frequency domain;

wherein the processor is further configured to:

allocate a partial blanking in another domain for corresponding pilot sequences from UEs comprised in at least one UE group of the plurality of UE groups;

wherein a sum of a length of the partial blanking and a length of the corresponding pilot sequences in another domain is equal to a length of data sequences in the another domain.

11. The access node according to claim 10, wherein the processor of the controller is further configured to:

assign a pilot sequence to each UE, wherein within each UE group, the assigned pilot sequences are mutually orthogonal.

12. A method for allocating time-frequency resource, comprising:

grouping a plurality of User Equipments (UEs) into a plurality of UE groups;

allocating a first group-specific data time-frequency resource to data sequences associated to UEs comprised in a first UE group of the plurality of UE groups;

allocating a second group-specific data time-frequency resource to data sequences associated to UEs comprised in a second UE group of the plurality of UE groups;

wherein the first and the second group-specific data time-frequency resources at least partly overlap in time domain;

allocating a first group-specific pilot time-frequency resource for pilot sequences from the UEs comprised in the first UE group; and allocating a second group-specific pilot time-frequency resource for pilot sequences from the UEs comprised in the second UE group;

wherein the first and the second group-specific pilot time-frequency resources do not overlap at least in one of frequency domain and the time domain; and wherein for each UE group, a group-specific pilot time-frequency resource is prior to or after a group-specific data time-frequency resource in one of the time domain and the frequency domain, wherein the processor is further configured to:

allocate a partial blanking in another domain for corresponding pilot sequences from UEs comprised in at least one UE group of the plurality of UE groups;

wherein a sum of a length of the partial blanking and a length of the corresponding pilot sequences in another domain is equal to a length of data sequences in the another domain.

13. The method for allocating time-frequency resource according to claim 12, further comprising:

assigning a pilot sequence to each UE, wherein within each UE group, pilot sequences are mutually orthogonal.

14. The method for allocating time-frequency resource according to claim 12, further comprising:

allocating a partial blanking in another domain for pilot sequences from UEs comprised in at least one UE group of the plurality of UE groups.

15. A non-transitory computer readable medium set in a computer, comprising program code for performing a method according to claim 12 when the program code is executed by a processor.

* * * * *